United States Patent
Kizu et al.

(10) Patent No.: US 8,883,925 B2
(45) Date of Patent: Nov. 11, 2014

(54) CYCLIC OLEFIN POLYMER COMPOSITION, USE THEREOF, AND CYCLIC OLEFIN POLYMER

(75) Inventors: Kouichi Kizu, Ichihara (JP); Masako Takamatsu, Ichihara (JP); Michio Tsugawa, Ichihara (JP); Ryouichi Seki, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 747 days.

(21) Appl. No.: 12/517,463

(22) PCT Filed: Dec. 3, 2007

(86) PCT No.: PCT/JP2007/001340
§ 371 (c)(1),
(2), (4) Date: Jun. 3, 2009

(87) PCT Pub. No.: WO2008/068897
PCT Pub. Date: Jun. 12, 2008

(65) Prior Publication Data
US 2010/0081768 A1    Apr. 1, 2010

(30) Foreign Application Priority Data
Dec. 5, 2006 (JP) .................................. 2006-328008

(51) Int. Cl.
*C08L 45/00* (2006.01)
*C08L 65/00* (2006.01)
*F21V 8/00* (2006.01)

(52) U.S. Cl.
CPC ............ *C08L 65/00* (2013.01); *C08L 45/00* (2013.01); *C08L 2205/02* (2013.01); *G02B 6/0065* (2013.01); *G02B 6/005* (2013.01)
USPC .............. 525/211; 525/210; 525/191; 349/96

(58) Field of Classification Search
CPC ................. C08L 45/00; C08L 23/16
USPC ......................... 525/210, 211, 289
See application file for complete search history.

(56) References Cited

U.S. PATENT DOCUMENTS

| | | | | |
|---|---|---|---|---|
| 4,874,808 A | * | 10/1989 | Minami et al. | 524/291 |
| 4,918,133 A | | 4/1990 | Moriya et al. | |
| 5,218,049 A | | 6/1993 | Yamamoto et al. | |
| 5,494,969 A | * | 2/1996 | Abe et al. | 525/289 |
| 7,524,542 B2 | * | 4/2009 | Kim et al. | 428/1.3 |
| 2006/0100403 A1 | * | 5/2006 | Yoon et al. | 526/218.1 |
| 2008/0177002 A1 | * | 7/2008 | Miyaki et al. | 525/210 |

FOREIGN PATENT DOCUMENTS

| | | | |
|---|---|---|---|
| GB | 2244276 | * | 11/1991 |
| JP | 63317521 | * | 12/1988 |
| JP | 1-163241 A | | 6/1989 |
| JP | 2-289637 A | | 11/1990 |
| JP | 3-72558 A | | 3/1991 |
| JP | 6-228380 A | | 8/1994 |
| JP | 7-324108 A | | 12/1995 |
| JP | 9-176397 A | | 7/1997 |
| JP | 2003-321591 A | | 11/2003 |
| JP | 2006-169542 A | | 6/2006 |
| WO | WO2004049011 | * | 6/2004 |

OTHER PUBLICATIONS

International Search Report (PCT/ISA/210) for PCT/JP2007/001340 completed Dec. 19, 2007.

* cited by examiner

*Primary Examiner* — Irina Krylova
(74) *Attorney, Agent, or Firm* — Buchanan, Ingersoll & Rooney PC

(57) ABSTRACT

A cyclic olefin polymer composition comprising: [A] a specific cyclic olefin polymer having a softening temperature (TMA) of 120 to 300° C.; and [B] a specific cyclic olefin polymer having a glass transition temperature (Tg) of 50° C. or lower, wherein the absolute value of the difference between $n_D[A]$ and $n_D[B]$ is 0.014 or less in which $n_D[B]$ represents a refractive index of the cyclic olefin polymer [B] and $n_D[A]$ represent that of the cyclic olefin polymer [A], and the component [A] is contained in an amount of 50 to 95 parts by weight and the component [B] is contained in an amount of 5 to 50 parts by weight (provided that the total amount of the components [A] and [B] is defined as 100 parts by weight).

15 Claims, 1 Drawing Sheet

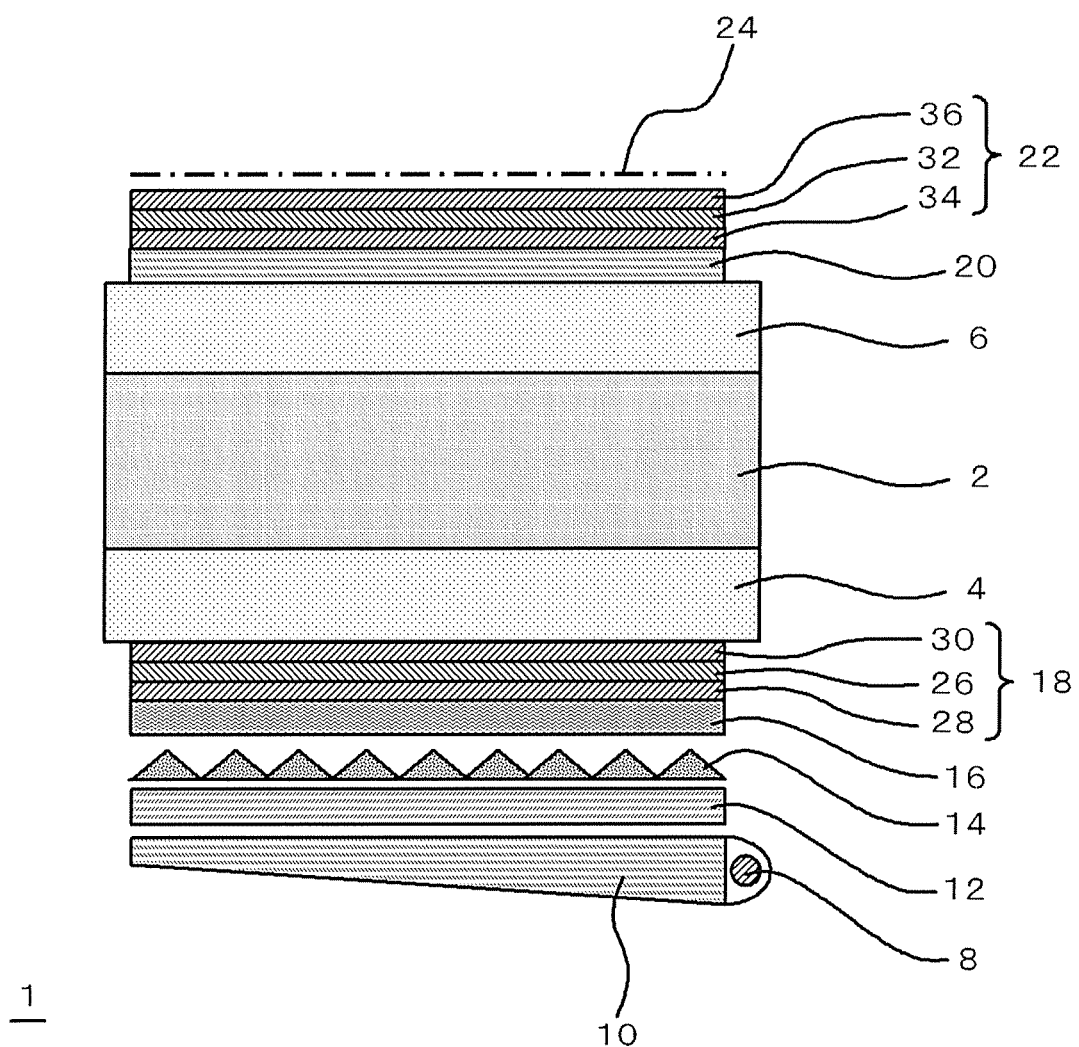

CYCLIC OLEFIN POLYMER COMPOSITION, USE THEREOF, AND CYCLIC OLEFIN POLYMER

TECHNICAL FIELD

The present invention relates to a cyclic olefin polymer composition, a molded product comprised of the polymer composition, and a cyclic olefin polymer.

BACKGROUND ART

It is well-known that a cyclic olefin random copolymer obtained by copolymerimerization of ethylene with a cyclic olefin, a ring-opening polymer of a cyclic olefin, and a hydrogenated product thereof are synthetic resins that provide excellent transparency while also striking a good balance between in low birefringence, heat resistance, heat aging resistance, chemical resistance, solvent resistance, and rigidity, and they are known to exhibit excellent performances in the field of optical materials such as optical memory disks and optical fibers.

Patent Document 1 discloses a cyclic olefin polymer composition that provides excellent in transparency, low birefringence, heat resistance, heat aging resistance, chemical resistance, solvent resistance, and the like, and in particular, can stably maintain excellent transparency even if the environment changes.

[Patent Document 1] JP-A-H09-176397

DISCLOSURE OF THE INVENTION

In addition, it may sometimes be necessary for the resulting sheet or film to be durable when preparing a film or a sheet from a polymer composition. For example, an extrusion molding process using the polymer composition is widely employed when molding a film. In this case, the resulting film is generally rolled up by a winder. Sufficient durability for this bending stress is required at this time.

From such a viewpoint, the polymer composition described in Patent Document 1 can be applied to a film due to exhibiting stable transparency against change in the environments such as temperature and humidity. However, there still remained a room for improvement in terms of the above-mentioned durability.

An object of the present invention is to provide a cyclic olefin polymer composition which has excellent transparency and heat resistance, as well as good molding processibility and excellent durability upon molding processing a film or a sheet, and a molded product which is comprised of the composition.

Furthermore, another object of the present invention is to provide a cyclic olefin polymer which includes a structural unit derived from a cyclic olefin as a structural component, and which has excellent flexibility and a relatively high refractive index.

The present inventors have extensively investigated the applications of a polymer including a cyclic olefin random copolymer or the like (hereinafter, it is referred to as a "cyclic olefin polymer") to a film or a sheet while maintaining its properties as described above. As a result, they have found that the durability required upon roll up and the like as described above is dependent on the toughness of a film or a sheet obtained by molding. In addition, they have found the durability that had been problematic when molding into a film or a sheet can be improved by imparting toughness to the cyclic olefin polymer serving as a material, thus solving the above-mentioned problem. Consequently, they have completed the present invention.

Specifically, the cyclic olefin polymer composition according to the present invention relates to the following.

[1] A cyclic olefin polymer composition comprising:

[A] a cyclic olefin polymer which (1) is selected from the following [A-1], [A-2], [A-3] and [A-4], and (2) has a softening temperature (TMA) of 120 to 300° C., and

[B] a cyclic olefin polymer having a glass transition temperature (Tg) of 50° C. or lower, wherein an absolute value of the difference between the refractive indices represented by the following equation is 0.014 or less;

$$|n_D[B]-n_D[A]|$$

wherein $n_D[B]$ represents the refractive index of the cyclic olefin polymer [B], and $n_D[A]$ represents the refractive index of the cyclic olefin polymer [A], which are measured in accordance with ASTM D542, and wherein the component [A] is contained in the amount of 50 to 95 parts by weight and the component [B] is contained in the amount of 5 to 50 parts by weight (provided that the total amount of the components [A] and [B] is defined as 100 parts by weight):

[A-1] a random copolymer comprising a structural unit derived from an α-olefin having two or more carbon atoms and a structural unit derived from a cyclic olefin represented by the following formula [I];

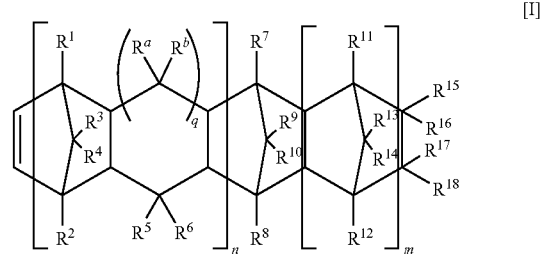

[I]

wherein in the formula [I], n is 0 or 1, m is 0 or a positive integer, q is 0 or 1, $R^1$ to $R^{18}$ and $R^a$ and $R^b$ are each independently a hydrogen atom, a halogen atom, or a hydrocarbon group which may be substituted with a halogen atom, $R^{15}$ to $R^{18}$ may be bonded to each other to form a monocyclic or polycyclic group, and the monocyclic or polycyclic group may have a double bond, and further, $R^{15}$ and $R^{16}$, or $R^{17}$ and $R^{18}$ may together form an alkylidene group,

[A-2] a ring-opening polymer or copolymer of the cyclic olefin represented by the formula [I],

[A-3] a hydrogenated product of the ring-opening polymer or copolymer [A-2], and

[A-4] a graft modified product of the [A-1], [A-2] or [A-3].

[2] The cyclic olefin polymer composition as described in [1], wherein the cyclic olefin polymer [B] is selected from the following [B-1] and [B-2]:

[B-1] a random copolymer comprising a structural unit derived from one or more kind(s) of α-olefin having two or more carbon atoms and a structural unit derived from one or more kind(s) of cyclic olefin selected from the group consisting of a cyclic olefin represented by the following formula [II] and a cyclic olefin represented by the following formula [III];

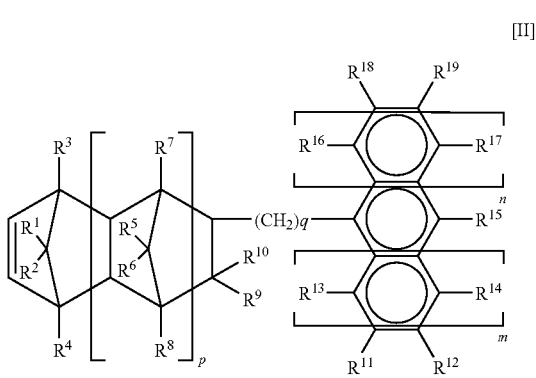

wherein in the formula [II], p and q are each 0 or a positive integer, m and n are each 0, 1 or 2, $R^1$ to $R^{19}$ are each independently a hydrogen atom, a halogen atom, a hydrocarbon group which may be substituted with a halogen atom, or an alkoxy group, a carbon atom to which $R^9$ or $R^{10}$ is bonded, and a carbon atom to which $R^{13}$ is bonded or a carbon atom to which $R^{11}$ is bonded may be bonded directly or via an alkylene group having 1 to 3 carbon atoms, and $R^{15}$ and $R^{12}$, or $R^{15}$ and $R^{19}$ may be bonded to each other to form an aromatic ring which is a monocyclic or polycyclic group in the case of n=m=0,

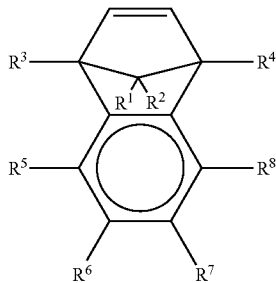

wherein $R^1$ to $R^8$ are each independently a hydrogen atom or a hydrocarbon group, and $R^5$ and $R^6$, $R^6$ and $R^7$, and $R^7$ and $R^8$ may be bonded to each other to form a monocyclic group which may contains a double bond, and

[B-2] a graft modified product of [B-1].

[3] The cyclic olefin polymer composition as described in [1] or [2], wherein the cyclic olefin polymer [B] has a crystallinity, as measured using DSC, of 5% or less.

[4] The cyclic olefin polymer composition as described in any one of [1] to [3], wherein a sheet having the thickness of 0.1 mm comprising the cyclic olefin polymer composition has a retardation at a wavelength 650 nm of 10 nm or less.

[5] The cyclic olefin polymer composition as described in any one of [1] to [4], wherein the cyclic olefin polymer [A] is selected from [A-1], [A-2] and [A-3].

[6] The cyclic olefin polymer composition as described in any one of [1] to [5], wherein the cyclic olefin polymer [A] has an intrinsic viscosity [η], as measured in decalin at 135° C., in the range of 0.05 to 10 dl/g.

[7] The cyclic olefin polymer composition as described in any one of [1] to [6], wherein the cyclic olefin polymer [B] has an intrinsic viscosity [η], as measured in decalin at 135° C., in the range of 0.5 to 5 dl/g.

[8] The cyclic olefin polymer composition as described in any one of [1] to [7], wherein the softening temperature (TMA) of the cyclic olefin polymer composition is 120 to 300° C.

[9] The cyclic olefin polymer composition as described in any one of [1] to [8], wherein a sheet having the thickness of 0.1 mm comprising the cyclic olefin polymer composition has a haze, as measured in accordance with JIS K7136, of 10% or less.

[10] A cyclic olefin polymer composition comprising:

[A] a cyclic olefin polymer which (1) is selected from the following [A-1], [A-2], [A-3] and [A-4], which (2) has a softening temperature (TMA) of 120 to 300° C., and which (3) has an intrinsic viscosity [η], as measured in decalin at 135° C., in the range of 0.05 to 10 dl/g, and

[B] a cyclic olefin polymer which is (1) selected from the following [B-1] and [B-2], (2) has a glass transition temperature (Tg) of 50° C. or lower, (3) has a crystallinity, as measured using DSC, of 5% or less, and (4) has an intrinsic viscosity [η], as measured in decalin at 135° C., in the range of 0.5 to 5 dl/g, wherein an absolute value of the difference between the refractive indices represented by the following equation is 0.014 or less;

$$|n_D[B]-n_D[A]|$$

wherein $n_D[B]$ represents the refractive index of the cyclic olefin polymer [B], and $n_D[A]$ represents the refractive index of the cyclic olefin polymer [A], which are measured in accordance with ASTM D542, wherein the component [A] is contained in the amount of 50 to 95 parts by weight and the component [B] is contained in the amount of 5 to 50 parts by weight (provided that the total amount of the components [A] and [B] is defined as 100 parts by weight), and wherein a sheet having the thickness of 0.1 mm comprising the cyclic olefin polymer composition has a haze, as measured in accordance with JIS K7136, of 10% or less:

[A-1] a random copolymer comprising a structural unit derived from an α-olefin having two or more carbon atoms and a structural unit derived from a cyclic olefin represented by the following formula [I];

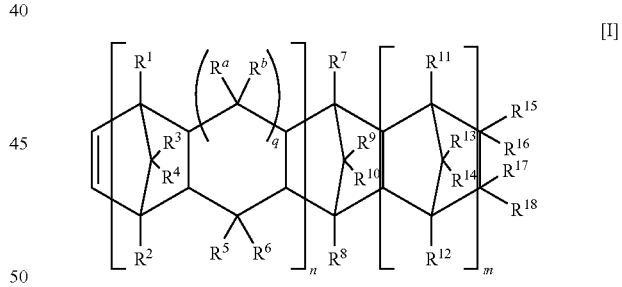

wherein in the formula [I], n is 0 or 1, m is 0 or a positive integer, q is 0 or 1, $R^1$ to $R^{18}$ and $R^a$ and $R^b$ are each independently a hydrogen atom, a halogen atom, or a hydrocarbon group which may be substituted with a halogen atom, $R^{15}$ to $R^{18}$ may be bonded to each other to form a monocyclic or polycyclic group, and the monocyclic or polycyclic group may have a double bond, and further, and $R^{15}$ and $R^{16}$, or $R^{17}$ and $R^{18}$ may together form an alkylidene group.),

[A-2] a ring-opening polymer or copolymer of the cyclic olefin represented by the formula [I],

[A-3] a hydrogenated product of the ring-opening polymer or copolymer [A-2],

[A-4] a graft modified product of [A-1], [A-2] or [A-3],

[B-1] a random copolymer comprising a structural unit derived from one or more kind(s) of α-olefin having two or more carbon atoms and a structural unit derived from one or more kind(s) of cyclic olefin selected from the group consisting of a cyclic olefin represented by the following formula [II] and a cyclic olefin represented by the following formula [III];

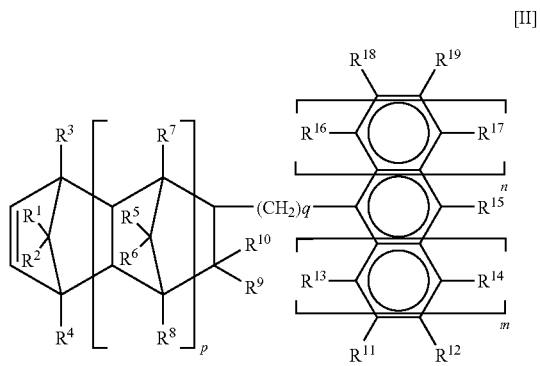

[II]

wherein in the formula [II], p and q are each 0 or a positive integer, m and n are each 0, 1 or 2, $R^1$ to $R^{19}$ are each independently a hydrogen atom, a halogen atom, a hydrocarbon group which may be substituted with a halogen atom, or an alkoxy group, a carbon atom to which $R^9$ or $R^{10}$ is bonded, and a carbon atom to which $R^{13}$ is bonded or a carbon atom to which $R^{11}$ is bonded may be bonded directly or via an alkylene group having 1 to 3 carbon atoms, and $R^{15}$ and $R^{12}$, or $R^{15}$ and $R^{19}$ may be bonded to each other to form an aromatic ring which is a monocyclic or polycyclic group in the case of n=m=0;

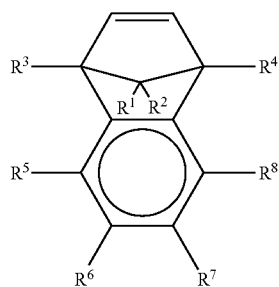

[III]

wherein $R^1$ to $R^8$ are each independently a hydrogen atom or a hydrocarbon group, and $R^5$ and $R^6$, $R^6$ and $R^7$, and $R^7$ and $R^8$ may be bonded to each other to form a monocyclic group which may contain a double bond, and

[B-2] a graft modified product of [B-1].

[11] A molded product comprising the cyclic olefin polymer composition as described in any one of [1] to [10].

[12] The molded product as described in [11], wherein the molded product is a film or a sheet.

[13] The molded product as described in [11] or [12], wherein the molded product is an optical film or an optical sheet.

[14] The molded product as described in any one of [11] to [13], which is an injection molded product.

[15] A protective film for polarizing plate comprising the cyclic olefin polymer composition as described in any one of [1] to [10].

[16] A polarizing plate provided with the protective film for polarizing plate as described in [15] on at least one side of a polarizer.

[17] A liquid crystal display device provided with the polarizing plate as described in [16].

In addition, the cyclic olefin polymer according to the present invention is as follows.

[18] A cyclic olefin polymer [BB], which is a random copolymer comprising a structural unit derived from one or more kind(s) of α-olefin having two or more carbon atoms, and a structural unit derived from one or more kind(s) of cyclic olefin selected from the group consisting of the cyclic olefins represented by the formula [II] and the cyclic olefins represented by the formula [III], and has an intrinsic viscosity [η], as measured in decalin at 135° C., of 0.05 to 10 dl/g, and has a glass transition temperature (Tg) of 50° C. or lower;

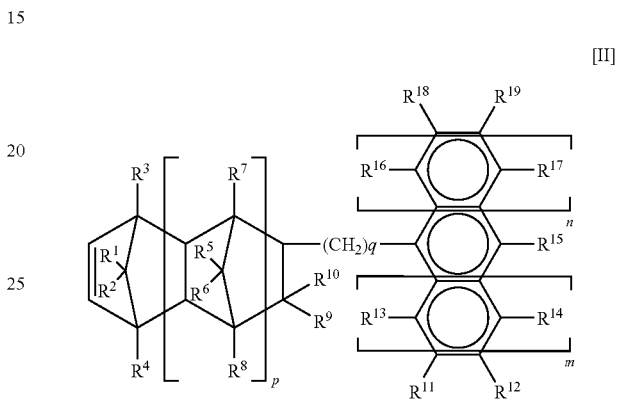

[II]

wherein in the formula [II], p and q are each 0 or a positive integer, m and n are each 0, 1 or 2, $R^1$ to $R^{19}$ are each independently a hydrogen atom, a halogen atom, a hydrocarbon group which may be substituted with a halogen atom, or an alkoxy group, a carbon atom to which $R^9$ or $R^{10}$ is bonded and a carbon atom to which $R^{13}$ is bonded or a carbon atom to which $R^{11}$ is bonded may be bonded directly or via an alkylene group having 1 to 3 carbon atoms, and $R^{15}$ and $R^{12}$, or $R^{15}$ and $R^{19}$ may be bonded to each other to form an aromatic ring which is a monocyclic or polycyclic group in the case of n=m=0, and;

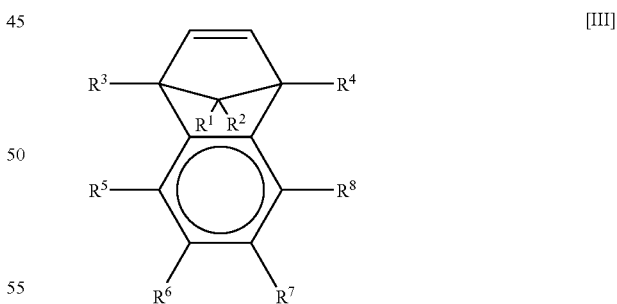

[III]

wherein $R^1$ to $R^8$ are each independently a hydrogen atom or a hydrocarbon group, and $R^5$ and $R^6$, $R^6$ and $R^7$, and $R^7$ and $R^8$ may be bonded to each other to form a monocyclic group and the monocyclic group may have a double bond.

According to a cyclic olefin polymer composition of the present invention, a molded product having transparency and heat resistance and good toughness is obtained. For example, a film or a sheet having excellent durability upon molding processing or an injection molded product having good toughness, and the like is obtained.

The molded product obtained from the cyclic olefin polymer composition of the present invention is provided with transparency and heat resistance, and has good toughness. In the case where the molded product is, for example, a film or a sheet, it has excellent durability during molding (durability against the bending stress when roll-up), and in the case where the molded product is an injection molded product, it has good toughness. The optical properties of the molded product of the present invention such as transparency, low birefringence, and the like are excellent, and the molded product is therefore suited to use as an optical film or an optical sheet.

The optical film obtained from the cyclic olefin polymer composition of the present invention has excellent in optical properties such as transparency, low birefringence, and the like, and is therefore suited to use as a protective film for polarizing plate. In addition, according to the present invention, a polarizing plate provided with the protective film for polarizing plate of the present invention on at least one side of a polarizer, and further, a liquid crystal display device provided with the polarizing plate can be provided.

In addition, according to the present invention, a cyclic olefin polymer which comprises a structural unit derived from a cyclic olefin as a structural component, and has excellent flexibility and a relatively high refractive index is provided.

BRIEF DESCRIPTION OF THE DRAWINGS

FIG. 1 shows a schematic cross-sectional view illustrating a liquid crystal display device provided with an optical film obtained from the cyclic olefin polymer composition of the present invention.

BEST MODE FOR CARRYING OUT THE INVENTION

Hereinbelow, the cyclic olefin polymer composition according to the present invention will be described in detail.

The cyclic olefin polymer composition according to the present invention contains a specific cyclic olefin polymer [A] in an amount of 50 to 95 parts by weight and a specific cyclic olefin polymer [B] in an amount of 5 to 50 parts by weight, preferably the component [A] in an amount of 50 to 90 parts by weight and the component [B] in an amount of 10 to 50 parts by weight, and more preferably the component [A] in an amount of 60 to 85 parts by weight and the component [B] in an amount of 15 to 40 parts by weight. The total amount of the components [A] and [B] is 100 parts by weight.

Hereinbelow, the cyclic olefin polymer [A] used in the present invention will be described.

In the present invention, as the cyclic olefin polymer [A],

[A-1] a random copolymer comprising a structural unit derived from an α-olefin having two or more carbon atoms and a structural unit derived from a cyclic olefin represented by the following formula [I],

[A-2] a ring-opening polymer or copolymer of the cyclic olefin represented by the following formula [I],

[A-3] a hydrogenated product of the ring-opening polymer or copolymer [A-2], or

[A-4] a graft modified product of the [A-1], [A-2] or [A-3] is used.

Hereinbelow, the cyclic olefin represented by the formula [I] which forms the cyclic olefin polymers [A-1] to [A-4] is described.

(Cyclic Olefin)

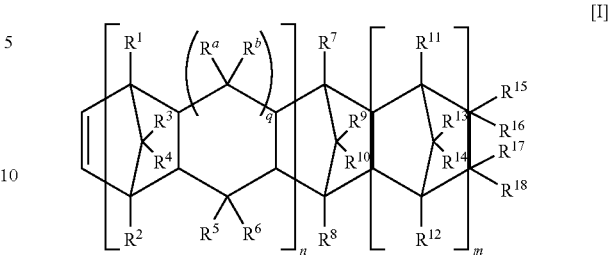

In the formula [I], n is 0 or 1, m is 0 or a positive integer, and q is 0 or 1. Further, in the case where q is 1, $R^a$ and $R^b$ are each independently an atom or a hydrocarbon group as described below, and in the case where q is 0, their bond are bonded to each other to form a 5-membered ring.

$R^1$ to $R^{18}$, and $R^a$ and $R^b$ are each independently a hydrogen atom, a halogen atom, or a hydrocarbon group. In this instance, the halogen atom is a fluorine atom, a chlorine atom, a bromine atom, or an iodine atom.

Further, examples of the hydrocarbon group typically include an alkyl group having 1 to 20 carbon atoms, a cycloalkyl group having 3 to 15 carbon atoms, and an aromatic hydrocarbon group. More specifically, examples of the alkyl group include a methyl group, an ethyl group, a propyl group, an isopropyl group, an amyl group, a hexyl group, an octyl group, a decyl group, a dodecyl group, and an octadecyl group, examples of the cycloalkyl group include a cyclohexyl group, and examples of the aromatic hydrocarbon group include a phenyl group, a naphthyl group, and the like. These hydrocarbon groups may be substituted with halogen atoms.

In addition, in the formula [I], $R^{15}$ to $R^{18}$ may be bonded to each other (combined together) to form a monocyclic or polycyclic group, and further, the monocyclic or polycyclic group thus formed may have a double bond. Specific examples of the monocyclic or polycyclic group as formed herein include the followings.

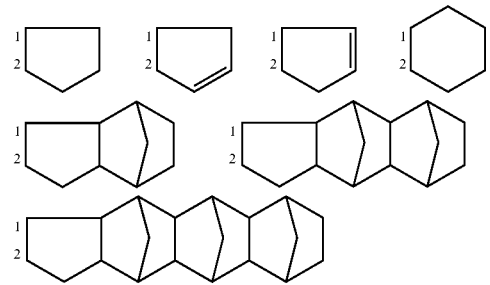

In above examples, the carbon atom numbered 1 or 2 represents a carbon atom to which $R^{15}$ ($R^{16}$) or $R^{17}$ ($R^{18}$) is bonded in the formula [I]. $R^{15}$ and $R^{16}$, or $R^{17}$ and $R^{18}$ may form an alkylidene group. This alkylidene group usually has 2 to 20 carbon atoms, and specific examples thereof include an ethylidene group, a propylidene group, and an isopropylidene group.

The cyclic olefin represented by the formula [I] is illustrated below in more detail.

Examples of the cyclic olefin represented by the formula [I], include bicyclo[2.2.1]-2-heptene (also termed norbornene) represented by the following formula and derivatives in which the bicyclo[2.2.1]-2-heptene is substituted with a hydrocarbon group.

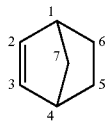

In the formula, the numbers 1 to 7 represent the position of carbon atoms.

Examples of the hydrocarbon group include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenyl), 5-(β-naphthyl), 5-(α-naphthyl), 5-(anthracenyl), 5,6-diphenyl, and the like.

Examples of the cyclic olefin represented by the formula [I] include tricyclo[4.3.0.1$^{2,5}$]-3-decene derivatives such as tricyclo[4.3.0.1$^{2,5}$]-3-decene, 2-methyl tricyclo[4.3.0.1$^{2,5}$]-3-decene, 5-methyl tricyclo[4.3.0.1$^{2,5}$]-3-decene, and the like, and tricyclo[4.4.0.1$^{2,5}$]-3-undecene derivatives such as tricyclo[4.4.0.1$^{2,5}$]-3-undecene, 10-methyl tricyclo[4.4.0.1$^{2,5}$]-3-undecene, and the like.

Examples of the cyclic olefin represented by the formula [I] include a tetracyclo[4.4.0.1$^{2,5}$.1$^{7,10}$]-3-dodecene represented by the following formula and a derivative in which the tetracyclo[4.4.0.1$^{2,5}$.1$^{7,10}$]-3-dodecene is substituted with a hydrocarbon group.

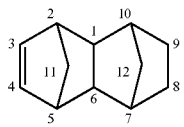

In the formula, the numbers 1 to 12 represent the positions number of carbon atoms.

Examples of the hydrocarbon group include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethylphenyl), 8-(isopropylphenyl), 8,9-diphenyl, 8-(biphenyl), 8-(β-naphthyl), 8-(α-naphthyl), 8-(anthracenyl), 5,6-diphenyl, and the like.

Examples of the cyclic olefin represented by the formula [I] include pentacyclo[6.5.1.1$^{3,6}$.0$^{2,7}$.0$^{9,13}$]-4-pentadecene and a derivative thereof; pentacyclo[7.4.0.1$^{2,5}$.1$^{9,12}$.0$^{8,13}$]-3-pentadecene and a derivative thereof; a pentacyclopentadecadiene compound such as pentacyclo[6.5.1.1$^{3,6}$.0$^{2,7}$.0$^{9,13}$]-4,10-pentadecadiene, and the like; pentacyclo [8.4.0.1$^{2,5}$.1$^{9,12}$.0$^{8,13}$]-3-hexadecene and a derivative thereof; pentacyclo [6.6.1.1$^{3,6}$.0$^{2,7}$.0$^{9,14}$]-4-hexadecene and a derivative thereof; hexacyclo[6.6.1.1$^{3,6}$.1$^{10,13}$.0$^{2,7}$.0$^{9,14}$]-4-heptadecene and a derivative thereof; heptacyclo[8.7.0.1$^{2,9}$.1$^{4,7}$.1$^{11,17}$.0$^{3,8}$.0$^{12,16}$]-5-eicocene and a derivative thereof; heptacyclo[8.8.0.1$^{2,9}$.1$^{4,7}$.1$^{11,18}$.0$^{3,8}$.0$^{12,17}$]-5-heneicocene and a derivative thereof; octacyclo[8.8.0.1$^{2,9}$.1$^{4,7}$.1$^{11,18}$.1$^{13,16}$.0$^{3,8}$.0$^{12,17}$]-5-docosene and a derivative thereof; nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene and a derivative thereof; nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene and a derivative thereof, and the like.

Specific examples of the cyclic olefin represented by the formula [I] are described above. Furthermore, but more specific structural examples of these compounds are described in paragraphs to [0052] in JP-A-6-228380. The cyclic olefin polymer used in the present invention may contain two or more kinds of the units derived from the cyclic olefin represented by the formula [I].

The cyclic olefins represented by the formula (I) can be prepared by a Diels-Alder reaction of cyclopentadine with an olefin having the corresponding structure.

The cyclic olefin polymer [A] used in the present invention can be prepared using the cyclic olefin represented by the formula (I). For example, the cyclic olefin polymer [A] can be prepared according to the processes suggested by the applicant in JP-A-S60-168708, JP-A-S61-120816, JP-A-S61-115912, JP-A-S61-115916, JP-A-S61-271308, JP-A-S61-272216, JP-A-S62-252406, JP-A-S62-252407, and the like, in which each of the reaction conditions is appropriately chosen.

[A-1] Random Copolymer Comprising a Structural Unit Derived from an α-olefin Having Two or more Carbon Atoms and a Structural Unit Derived from a Cyclic Olefin Represented by the Formula [I]

The random copolymer comprising a structural unit derived from an α-olefin having two or more carbon atoms and a structural unit derived from a cyclic olefin represented by the formula [I] (which may be hereinafter referred to as a random copolymer [A-1]) contains a unit derived from an α-olefin having two or more carbon atoms in an amount of usually 5 to 80% by mole, preferably 20 to 75% by mole, and a unit derived from the cyclic olefin in an amount of usually 20 to 95% by mole, preferably 25 to 80% by mole. The total of the unit derived from the α-olefin having two or more carbon atoms and the unit derived from the cyclic olefin is 100% by mole. The composition of the unit derived from the α-olefin having two or more carbon atoms and the unit derived from the cyclic olefin can be measured by $^{13}$C-NMR.

The α-olefin having two or more carbon atoms may be linear or branched. It is preferably an α-olefin having 20 or less carbon atoms. Examples of this α-olefin specifically include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 3-ethyl-1-hexene, 1-octene, 1-decene, 1-dodecene, 1-tetradodecene, 1-hexadecene, 1-octadecene, 1-eicocene, and the like. Among these, ethylene or propylene is preferable, and ethylene is particularly preferable. These α-olefins may be used alone or in combination of two or more kinds thereof.

As the cyclic olefin, specifically, the cyclic olefin represented by the formula [I] is used. These cyclic olefins may be used alone or in combination of two or more kinds thereof.

The random copolymer [A-1] is formed by randomly bonding the above units derived from the α-olefin having two or more carbon atoms and the above units derived from the cyclic olefin in line to give a substantially linear structure.

It appears that in the random copolymer [A-1] used in the present invention, at least a part of the structural unit derived from the cyclic olefin represented by the formula [I] constitutes the repeating unit represented by the following formula [I-i].

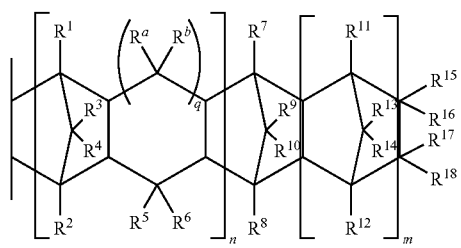

[I-i]

In the formula [I-i], n, m, q, $R^1$ to $R^{18}$, and $R^a$ and $R^b$ have the same meanings as defined for the formula [I]

Further, the random copolymer [A-1] may have a unit derived from other copolymerizable monomers within a range of not impairing the purpose of the present invention, if desired, and may specifically have a unit derived from other monomers in an amount of usually 20% by mole or less, preferably 10% by mole or less, based on 100% by mole of the total of a structural unit derived from an α-olefin having two or more carbon atoms and a structural unit derived from the cyclic olefin [I].

Examples of these other monomers include cyclic olefins other than the cyclic olefin represented by the formula [I], and specific examples thereof include cycloolefins such as cyclobutene, cyclopentene, cyclohexene, 3,4-dimethylcyclopentene, 3-methylcyclohexene, 2-(2-methylbutyl)-1-cyclohexene and cyclooctene, 3a,5,6,7a-tetrahydro-4,7-methano-1H-indene, and the like, and non-conjugated dienes such as 1,4-hexadiene, 4-methyl-1,4-hexadiene, 5-methyl-1,4-hexadiene, 1,7-octadiene, dicyclopentadiene and 5-vinyl-2-norbornene, and the like. The random copolymer [A-1] may contain two or more kinds of the units derived from the other monomers.

The random copolymer [A-1] can be prepared using an α-olefin having two or more carbon atoms and the cyclic olefin represented by the formula [I] with the preparation method as described in the above-described publication. In these process, the random copolymer [A-1] is preferably prepared by performing a copolymerization reaction in a hydrocarbon solvent using a catalyst formed from a vanadium compound which is soluble in the hydrocarbon solvent and an organic aluminum compound as a catalyst.

Further, a solid state Group IVA metallocene catalyst can be used to prepare random copolymer [A-1] obtained from an α-olefin having two or more carbon atoms and cyclic olefin. This a solid state Group IVA metallocene catalyst is formed from a transition metal compound containing a ligand having at least one cyclopentadienyl skeleton (a metallocene compound) and an organic aluminumoxy compound, and if desired, an organic aluminum compound. Here, examples of transition metal in the group IVA include zirconium, titanium, or hafnium. Examples of the ligand containing a cyclopentadienyl skeleton include a cyclopentadienyl group which may be substituted with an alkyl group, an indenyl group, a tetrahydroindenyl group, a fluorenyl group, and the like. These groups may be bonded via other groups such as an alkylene group. Examples of the ligand other than the ligand containing a cyclopentadienyl skeleton usually include an alkyl group, a cycloalkyl group, an aryl group, an aralkyl group, and the like.

Furthermore, as the organic aluminumoxy compound and the organic aluminum compound, those used for the preparation an olefin polymer can be typically used. These solid IVA group metallocene-based catalysts are described in detail in, for example, JP-A-61-221206, JP-A-64-106, JP-A-2-173112, and the like.

In addition, a phenoxyimine-based catalyst (FI catalyst) or a pyrroleimine-based catalyst (PI catalyst) can be used to prepare the random copolymer [A-1] comprising the α-olefin having two or more carbon atoms and cyclic olefin. These catalysts comprise (a) a transition metal compound having phenoxyimine or pyrroleimine as a ligand, and (b) one or more kind(s) of compound selected from (b-1) an organic metal compound, (b-2) an organic aluminumoxy compound, and (b-3) a compound that reacts with the transition metal compound (a) to form an ion pair, as described in JP-A-2001-72706, JP-A-2002-332312, JP-A-2003-313247, JP-A-2004-107486, and JP-A-2004-107563. Herein, as the transition metal contained in the transition metal compound, the transition metal of Groups 3 to 11 in the periodic table can be used.

[A-2] Ring-opening (Co)polymer of Cyclic Olefin

In the ring-opening polymer or ring-opening copolymer [A-2] of the cyclic olefin, at least a part of the unit derived from the cyclic olefin represented by the formula [I] is represented by the following formula [I-ii].

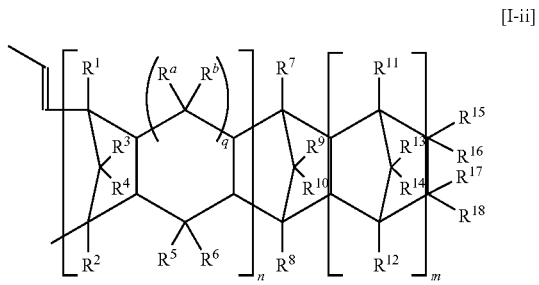

[I-ii]

In the formula [I-ii], n, m, q, $R^1$ to $R^{18}$, and $R^a$ and $R^b$ have the same meanings as defined for the formula [I].

The ring-opening (co)polymer can prepared by the preparation method disclosed in the above-described publication, and it can be prepared, for example, by polymerization or copolymerization of the cyclic olefin represented by the formula [I] in the presence of a ring-opening polymerization catalyst.

As the ring-opening polymerization catalyst, catalysts comprising halogenated compounds, nitrate salts or acetyl acetone compounds of metals such as ruthenium, rhodium, palladium, osmium, indium and platinum with reducing agents; or catalysts comprising halogenated compounds or acetyl acetone compounds of metals such as titanium, palladium, zirconium and molybdenum with organic aluminum compounds can be used, and the ring-opening (co)polymers of the cyclic olefins can be obtained by the method described in, for example, JP-A-H7-324108.

[A-3] Hydrogenated Product of Ring-opening (Co)polymer

The hydrogenated product [A-3] of the ring-opening (co) polymer can be obtained by hydrogenation of the ring-opening polymer or ring-opening copolymer [A-2] in the presence of a hydrogenation catalyst that is conventionally known, for example, as described in JP-A-7-324108.

It appears that in the hydrogenated product [A-3] of the ring-opening (co)polymer, at least a part of the unit derived from the cyclic olefin represented by the formula [I] is represented by the following formula [I-iii].

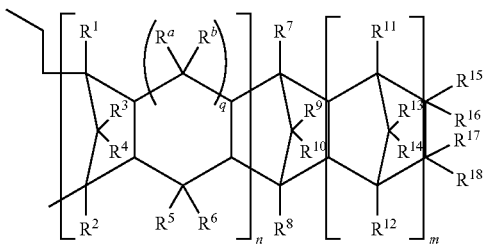

In the formula [I-iii], n, m, q, $R^1$ to $R^{18}$, and $R^a$ and $R^b$ have the same meanings as defined for the formula [I].

As the hydrogenated product of the ring-opening polymer of the cyclic olefin, for example, Zeonor 1420R manufactured by Nippon Zeon Co. LTD., etc can be used.

[A-4] Graft Modified Product

The graft modified product of the cyclic olefin polymer is a graft modified product [A-4] of the random copolymer [A-1] comprising a structural unit derived from an α-olefin having two or more carbon atoms and a structural unit derived from a cyclic olefin represented by formula [I], the ring-opening (co)polymer [A-2] of cyclic olefin, or a hydrogenated product [A-3] of the ring-opening (co)polymer.

As a modifier for obtaining the graft modified product [A-4], an unsaturated carboxylic acid is usually used, and specific examples thereof include unsaturated carboxylic acids such as (meth)acrylic acid, maleic acid, fumaric acid, tetrahydrophthalic acid, itaconic acid, citraconic acid, crotonic acid, isocrotonic acid, endocis-bicyclo[2.2.1]hept-5-ene-2,3-dicarboxilic acid (Nadic Acid™), and the like; and derivatives of these unsaturated carboxylic acids such as an unsaturated carboxylic acid anhydride, an unsaturated carboxylic acid halide, an unsaturated carboxylic acid amide, an unsaturated carboxylic acid imide, an unsaturated carboxylic acid ester, and the like. More specific examples of the unsaturated carboxylic acid derivatives include maleic acid anhydride, citraconic acid anhydride, maleyl chloride, maleimide, monomethyl maleate, dimethyl maleate, glycidyl maleate, and the like.

Among these modifiers, an α,β-unsaturated dicarboxylic acid and an α,β-unsaturated dicarboxylic acid anhydride such as maleic acid, Nadic Acid and acid anhydrides of these acids are preferably employed. These modifiers may also be used alone or in combination of two or more kinds thereof. It is preferable that the modification rate in the graft modified product [A-4] of the cyclic olefin polymer used in the present invention is generally 10% by mole or less.

In order to obtain a graft modified product of the cyclic olefin polymer from the cyclic olefin polymer [A-1], [A-2] or [A-3] with the modifier, a conventionally known method for modification of the polymers can be widely applied. A graft modified product can be obtained, for example, by a method in which a modifier is added to the cyclic olefin polymer [A-1], [A-2] or [A-3] in the melt state to perform a graft polymerization (reaction), a method in which a modifier is added to a solution of the cyclic olefin polymer [A-1], [A-2] or [A-3] in a solvent to perform a graft reaction, and the like.

The graft reaction is usually performed at a temperature of 60 to 350° C. Further, the graft reaction can be carried out under the coexistence of a radical initiator such as organic peroxide and an azo compound, and the like.

Further, the modified product with the above modification rate can be directly obtained by the graft reaction of an unmodified cyclic olefin polymer with a modifier, or can be obtained by carrying out a graft reaction of a cyclic olefin polymer with a modifier to preliminarily prepare a modified product with a high modification rate, and then diluting the modified product with an unmodified cyclic olefin polymer to a desired modification rate.

In the present invention, as the cyclic olefin polymer [A], any one of [A-1], [A-2], [A-3] and [A-4] may be used alone, as a mixture of two or more in one kind, or in combination of two or more kinds thereof. Among these, as the cyclic olefin polymer [A], the random copolymer [A-1] comprising the α-olefin having two or more carbon atoms and cyclic olefin, which has a tendency of low birefringence, is preferably used. The crystallinity of the cyclic olefin polymer, as measured using DSC, is usually 0 to 20%, preferably 0 to 2%.

The cyclic olefin polymer [A] used in the present invention has a softening temperature (TMA) of 120° C. to 300° C., preferably 120 to 250° C., more preferably 125 to 200° C. The intrinsic viscosity [η] (in decalin at 135° C.) of the cyclic olefin polymer [A] is not particularly limited, but it is from 0.05 to 10 dl/g, preferably from 0.1 to 5 dl/g, more preferably from 0.4 to 3.0 dl/g.

Hereinbelow, the cyclic olefin polymer [B] used in the present invention is described.

In the present invention, as the cyclic olefin polymer [B], a cyclic olefin polymer having a glass transition temperature (Tg) of 50° C. or lower is used.

As the cyclic olefin polymer [B], [B-1] a random copolymer comprising a structural unit derived from one or more kind(s) of α-olefin having two or more carbon atoms and a structural unit derived from one or more kind(s) of cyclic olefin selected from the group consisting of the cyclic olefins represented by the following formula [II] and the following formula [III] (which may be referred to a random copolymer [B-1]), or [B-2] a graft modified product of the [B-2] is used.

Hereinbelow, the cyclic olefin represented by the formula [II] or the formula [III] to form the cyclic olefin polymers [B-1] to [B-2] is described.

(Cyclic Olefin)

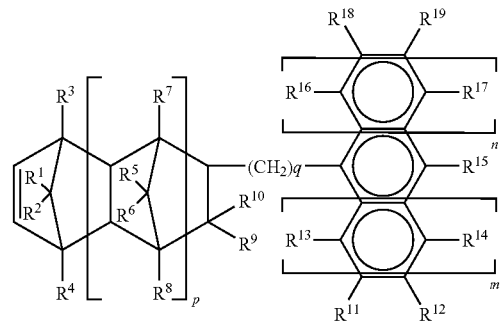

In the formula [II], p and q are each 0 or a positive integer, m and n are each 0, 1 or 2, $R^1$ to $R^{19}$ are each independently a hydrogen atom, a halogen atom, a hydrocarbon group which may be substituted with a halogen atom, or an alkoxy group, a carbon atom to which $R^9$ or $R^{10}$ is bonded, and a carbon atom to which R[13] is bonded or a carbon atom to which R[11] is bonded may be bonded directly or via an alkylene group having 1 to 3 carbon atoms, and R[15] and R[12], or R[15] and R[19] may be bonded to each other to form an aromatic ring which is a monocyclic or polycyclic group in the case of n=m=0.

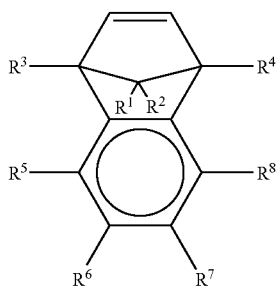

[III]

In the formula, R[1] to R[8] are each independently a hydrogen atom or a hydrocarbon group, and R[5] and R[6], R[6] and R[7], and R[7] and R[8] may be bonded to each other to form a monocyclic group, and the monocyclic group may have a double bond.

Here, in the formula [II], p and q is 0, 1 or 2, and R[1] to R[15] each independently represent an atom or group selected from the group consisting of a hydrogen atom, an aliphatic hydrocarbon group, an alicyclic hydrocarbon group, and an aromatic hydrocarbon group. Examples of the aliphatic hydrocarbon group include alkyl groups having 1 to 6 carbon atoms such as a methyl group, an ethyl group, a propyl group, an isopropyl group, an n-butyl group, an isobutyl group, an amyl group, a hexyl group, and the like. Examples of the alicyclic hydrocarbon group include a cyclopropyl group, a cyclobutyl group, a cyclopentyl group, a cyclohexyl group, and the like. Examples of the aromatic hydrocarbon group include an aryl group and an aralkyl group, and specifically, a phenyl group, a tolyl group, a naphthyl group, a benzyl group, a phenylethyl group, and the like.

R[5] (or R[6]) and R[9] (or R[7]) may be bonded via an alkylene group having 1 to 3 carbon atoms, or bonded directly without a mediated group. In addition, when p=q=0, R[15] and R[12], or R[15] and R[19] may be bonded to each other to form an aromatic ring which is a monocyclic or polycyclic group.

In the formula [III], R[1] to R[8] are each independently a hydrogen atom, or a hydrocarbon group having 4 or less carbon atoms. Examples of the hydrocarbon group having 4 or less carbon atoms include alkyl groups such as a methyl group, an ethyl group, a propyl group, an isopropyl group, an n-butyl group, an isobutyl group, and the like, and cycloalkyl groups such as a cyclopropyl group, and the like.

R[5] and R[6], R[6] and R[7], R[7] and R[8] may be bonded to each other to form a monocyclic group, and the monocyclic group may have a double bond.

Specific examples of the cyclic olefin used in the present invention include the following compounds. These cyclic olefins can be prepared by a Diels-Alder reaction of cyclopentadiene with an olefin having the corresponding structure, or by other methods. Also, for example, benzonorbornadiene (which may be referred to as BNBD) or a derivative thereof can be prepared by a conventional method, for example, a method described in GB2244276. For example, BNBD can be obtained by reacting cyclopentadiene and 2-aminobenzoic acid in the presence of 1,2-dimethoxyethane.

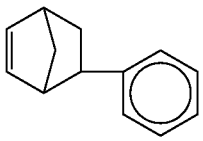

5-Phenyl-bicyclo[2.2.1]hepto-2-ene

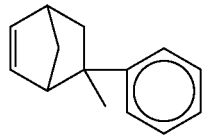

5-Methyl-5-phenyl-bicyclo[2.2.1]hepto-2-ene

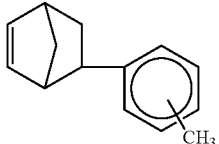

5-Tolyl-bicyclo[2.2.1]hepto-2-ene

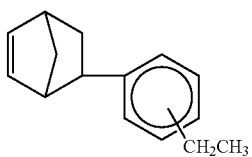

5-(Ethylphenyl)-bicyclo[2.2.1]hepto-2-ene

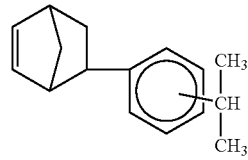

5-(Isopropylphenyl)-bicyclo[2.2.1]hepto-2-ene

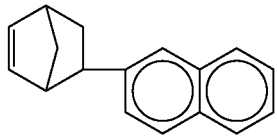

5-(α-Naphthyl)-bicyclo[2.2.1]hepto-2-ene

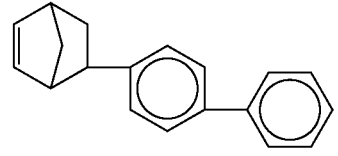

5-(Biphenyl)-bicyclo[2.2.1]hepto-2-ene

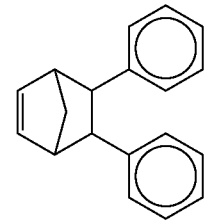

5,6-(Diphenyl)-bicyclo[2.2.1]hepto-2-ene

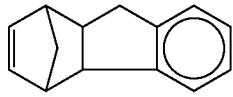

1,4-Methano-1,4,4a,9a-tetrahydrofluorene

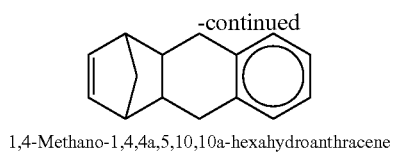

1,4-Methano-1,4,4a,5,10,10a-hexahydroanthracene

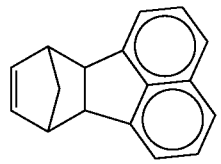

Cyclopentadiene-acenaphthylene adduct

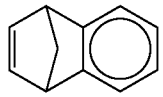

Cyclopentadiene-benzyne adduct
Benzonorbornadiene

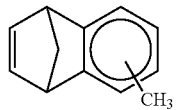

Benzonorbornadiene derivative

Further, specific examples of the cyclic olefins represented by the formula [II] and the formula [III] are shown above, but specific examples of the structures of these compounds are shown in paragraphs [0053] through [0058] in the specification of JP-A-H06-228380. The cyclic olefin polymer used in the present invention may contain two or more kinds of the units derived from the cyclic olefins selected from the group comprising the cyclic olefins represented by the formula [II] and the formula [III].

[B-1] Random Copolymer which is Comprised of a Structural Unit Derived from One or more Kind(s) of α-olefin Having Two or more Carbon Atoms and a Structural Unit Derived from One or more Kind(s) of Cyclic Olefin Selected from the Group Consisting of a Cyclic Olefin Represented by the Following Formula [II] and a Cyclic Olefin Represented by the Following Formula [III].

The random copolymer [B-1] contains a unit derived from an α-olefin having two or more carbon atoms in an amount of usually 80 to 95% by mole, preferably 80 to 90% by mole, more preferably 81 to 90% by mole, and a unit derived from the cyclic olefin in an amount of usually 5 to 20% by mole, preferably 10 to 20% by mole, and more preferably 10 to 19% by mole. Here, the total of the structural unit derived from an α-olefin having two or more carbon atoms and the structural unit derived from one or more kind(s) of cyclic olefin selected from the group consisting of the cyclic olefin represented by the formula [II] and the cyclic olefin represented by the formula [III] is 100% by mole. Further, the composition of the structural unit derived from the α-olefin having two or more carbon atoms, and the composition of the structural unit derived from the cyclic olefin can be measured by $^{13}$C-NMR.

The α-olefin having two or more carbon atoms may be linear or branched, and it can be selected in a similar way to the above-described cyclic olefin polymer [A-1] (random copolymer [A-1]). Among these, ethylene or propylene is preferable, and ethylene is particularly preferable.

These α-olefins may be used alone or in combination of two or more kinds thereof.

As the cyclic olefin, specifically, the cyclic olefins selected from the group consisting of the cyclic olefins represented by the formula [II] and the formula [III] are used. These cyclic olefins may be used alone or in combination of two or more kinds thereof.

In this random copolymer [B-1], the units derived from the α-olefin having two or more carbon atoms and the units derived from a specific cyclic olefin as described above are randomly bonded to give a substantially linear structure.

It appears that in the random copolymer [B-1] used in the present invention, at least a part of the structural unit derived from a cyclic olefin selected from the group consisting of the cyclic olefin represented by the formula [II] and the cyclic olefin represented by the formula [III] constitutes the repeating units represented by the following formula [II-i] and the following formula [III-i].

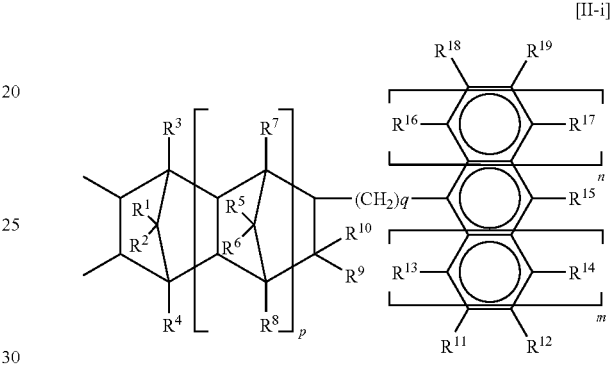

[II-i]

In the formula [II-i], n, m, p, q, and $R^1$ to $R^{19}$ have the same meanings as defined for the formula [II].

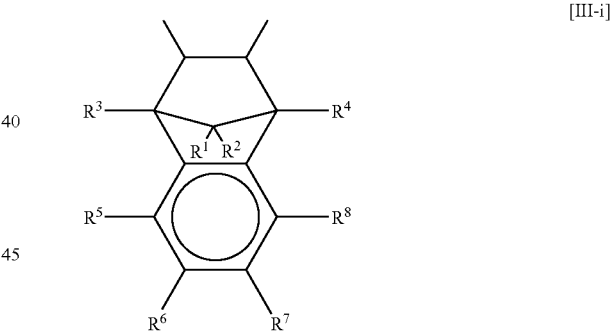

[III-i]

In the formula [III-i], $R^1$ to $R^8$ have the same meanings as defined for the formula [III]

Further, the random copolymer [B-1] may have a unit derived from other copolymerizable monomers within a range not impairing the purpose of the present invention, if desired, and may specifically have a unit derived from the cyclic olefin represented by the formula [I] or other monomers in an amount of usually 20% by mole or less, preferably 10% by mole or less, based on 100% by mole of the total of a structural unit derived from an α-olefin having two or more carbon atoms and a structural unit derived from one or more kind(s) of cyclic olefin selected from the group consisting of the cyclic olefin represented by the formula [II] and the cyclic olefin represented by the formula [III].

Examples of these other monomers include cyclic olefins other than the cyclic olefins represented by the formulae [I], [II], and [III], and specific examples thereof include cycloolefins such as cyclobutene, cyclopentene, cyclohexene, 3,4- dimethyl cyclopentene, 3-methyl cyclohexene, 2-(2-methylbutyl)-1-cyclohexene and cyclooctene, 3a,5,6,7a-tetrahydro-4,7-methano-1H-indene, and the like, and non-conjugated dienes such as 1,4-hexadiene, 4-methyl-1,4-hexadiene, 5-methyl-1,4-hexadiene, 1,7-octadiene, dicyclopentadiene and 5-vinyl-2-norbornene, and the like. The random copolymer [B-1] may contain two or more kinds of the units derived from the other monomers.

The random copolymer [B-1] can be prepared using at one or more kind(s) selected from the α-olefins having two or more carbon atoms and one or more kind(s) of the cyclic olefin selected from the group consisting of the cyclic olefin represented by the formula [II] and the cyclic olefin represented by the formula [III] by the same preparation method as for the random copolymer [A-1].

[B-2] Graft Modified Product

The graft modified product of the cyclic olefin polymer is a graft modified product of the random copolymer [B-1] comprising the above-described α-olefin having two or more carbon atoms and cyclic olefin.

This graft modified product can be prepared by the same preparation method as for the graft modified product [A-4].

In the present invention, as the cyclic olefin polymer [B], either of [B-1] and [B-2] can be used alone, in a mixture of two or more in one kind, or in combination of two or more kinds thereof.

As the cyclic olefin of the cyclic olefin polymer [B] used in the present invention, the cyclic olefin represented by the formula [III] is preferably used. The cyclic olefin polymer obtained by copolymerizing the cyclic olefin represented by the formula [III] is well-balanced in heat resistance and flexibility.

For the cyclic olefin polymer [B] used in the present invention, the intrinsic viscosity [η] in decalin at 135° C. is from 0.5 to 5 dl/g, preferably from 0.6 to 5 dl/g, more preferably from 0.8 to 5 dl/g. The crystallinity, as measured using DSC, is from 0 to 5%, preferably 0 to 2%. The glass transition temperature (Tg) is 50° C. or lower, preferably from −20 to 50° C., more preferably from −20 to 40° C. The glass transition temperature (Tg) can be obtained by DSC measurement or by viscoelasticity measurement.

The refractive index $n_D[B]$ as measured in accordance with ASTM D542 of the cyclic olefin polymer [B] used in the present invention is not particularly limited, but it is preferably from 1.525 to 1.550, more preferably from 1.535 to 1.550, even more preferably from 1.538 to 1.548.

When the refractive index of the cyclic olefin polymer [B] used in the present invention is $n_D[B]$, and the refractive index of the cyclic olefin polymer [A] is $n_D[A]$, as measured in accordance with ASTM D542, the absolute value of the difference between the refractive indices represented by the following formula is 0.014 or less, preferably 0.010 or less, more preferably 0.005 or less.

$$|n_D[B]-n_D[A]|$$

When the absolute value of difference between the refractive index of the cyclic olefin polymer [A] and that of the cyclic olefin polymer [B] is in the above-described range, a molded product obtained from the cyclic olefin polymer composition has excellent in optical properties such as transparency, low birefringence, and the like as well as in heat resistance, and further, it has good toughness and excellent durability against the bending stress upon roll up.

The cyclic olefin polymer composition according to the present invention contains the cyclic olefin polymer [B], and as a result, its excellent transparency can be stably maintained under an environmental change from a high temperature/high humidity atmosphere to an ambient temperature/ambient humidity atmosphere.

The softening temperature (TMA) of the cyclic olefin polymer composition according to the present invention is not particularly limited, but it is preferably 120° C. to 300° C., more preferably 120° C. to 250° C., even more preferably 125° C. to 200° C.

In a sheet having a thickness of 0.1 mm which is comprised of the cyclic olefin polymer composition according to the present invention, the haze thereof as measured in accordance with JIS K7136, is not particularly limited, but it is preferably 10% or less, more preferably 8% or less, even more preferably 5% or less.

Furthermore, the sheet having the thickness of 0.1 mm which is comprised of the cyclic olefin polymer composition of the present invention has a retardation at a wavelength 650 nm of 10 nm or less. For this reason, it can be suitably used as a protective film for polarizing plate for which low retardation is required.

A method for preparing the sheet having the thickness of 0.1 mm used in measurement of the haze and the phase difference is not particularly limited, but the methods include a method using the cyclic olefin polymer composition in a melt state, such as extrusion molding, press molding, injection molding, and the like; a method in which a solution of a resin with a solvent for dissolving the resin is prepared, and then the solution thereof is applied on a metal plate, a glass plate or other resin films by well-known methods such as a bar coater, a T die coater, a spin coater, and the like, and the film is peeled off after the solvent is removed; and a method in which a film obtained from the afore-mentioned methods is stretched.

Further, the water absorption as measured in accordance with ASTM D570 is not particularly limited, but it is preferably 0.05% or less, preferably 0.04% or less.

The cyclic olefin polymer composition according to the present invention can be obtained by a method of melt-kneading the components [A] and [B] using a well-known kneader such as an extruder, a Banbury mixer, and the like; a method of dissolving the components [A] and [B] in a common solvent and then evaporating the solvent; a method of adding a solution of [A] and [B] to an poor solvent for precipitation; and other methods.

In addition, the cyclic olefin polymer composition according to the present invention may further contain other resins, elastomers, and the like, such as a styrenic thermoplastic elastomer, within a range not impairing the purpose of the present invention. Examples of the styrenic thermoplastic elastomer include block copolymers of styrenes and conjugated diene compounds. Specific examples thereof include a styrene-butadiene diblock copolymer, a styrene-butadiene-styrene triblock copolymer, a styrene-isoprene diblock copolymer, a styrene-isoprene-styrene triblock copolymer, a hydrogenated product of a styrene-butadiene diblock copolymer, a hydrogenated product of a styrene-butadiene-styrene triblock copolymer, a hydrogenated product of a styrene-isoprene diblock copolymer, and a hydrogenated product of a styrene-isoprene-styrene triblock copolymer.

Further, the cyclic olefin polymer composition according to the present invention may contain various additives, for example, a dye, a pigment, a stabilizer, a plasticizer, an antistatic agent, a UV absorber, an antioxidant, a lubricant, a filler, and the like, if desired, within a range not impairing the purpose of the present invention.

The cyclic olefin polymer composition according to the present invention can be used as a variety of molded products by well-known molding methods. For example, the cyclic olefin polymer composition can be molded into a sheet shape, a film shape, or other shapes, by a molding method such as an injection molding method, a T die extrusion method, an inflation method, a press method, and other methods. Also, the film or sheet can be used as unstretched one, or can be used after stretching treatment such as monoaxial stretching or biaxial stretching according to the use or purpose. The molded product of the present invention has excellent in transparency and heat resistance, as well as in toughness.

The film or sheet obtained by extrusion molding with T die of the cyclic olefin polymer composition of the present invention has heat resistance, transparency, and low moisture absorption, and further, it has improved toughness such that it exhibits high folding endurance and break elongation. For this reason, even when the film or sheet is cut off according to various optical film applications, it is harder to generate cracks, thereby it being suitable for the applications of an optical film for which durability during processing is required. The optical film is suitable to be applied as an optical device in terms of transparency, heat resistance, and the like.

Specific examples of the applications of the optical film obtained from such a cyclic olefin polymer composition of the present invention include a view angle compensation film, a retardation film, a protective film for polarizing plate, a diffuser film contained in a light guide plate, a prism sheet, and a reflective sheet, and a light collecting board, a substrate for an LCD, a film for processing in a high-temperature process, an optical inspection film, a touch panel, a backlight for an organic EL, a film for an electropaper, a protecting film for an organic EL display, a display device substrate for an organic EL, an organic TFT substrate, an AR-based film, a polarizing reflective sheet, a prism sheet, a light transmissive recording sheet, a protecting film for an optical information recording media, a substrate for a light-shielding plate, an optical bandpass filter incorporated with a near-infrared absorbent, a heat ray cut film, and the like.

FIG. 1 shows a liquid crystal display device in which an optical film obtained from the cyclic olefin polymer composition of the present invention is employed.

According to FIG. 1, the liquid crystal display device 1 is provided with a liquid crystal element formed by sandwiching a liquid crystal cell 2 between the glass substrates 4 and 6, and a light source 8 and a light guide plate 10 for supplying light to the liquid crystal element. In the order from the side of the light guide plate 10, a light diffuser plate 12 for diffusing light, a lens film 14 for controlling the direction of light travel, a luminance improving film 16, and a first polarizing plate 18 are provided between the light guide plate 10 and a glass substrate 4. On a surface opposite to the liquid crystal cell 2, a retardation plate 20 and a second polarizing plate 22 for compensating a view angle by correcting the birefringence of light transmitted through the liquid crystal cell 2, and an AG/AR film 24 composed of Anti-Glare (AG) and Anti-Reflection (AR) properties are provided in this order.

In the first polarizing plate 18, each of protective film for polarizing plates 28 and 30 are provided on both surfaces of a polarizer 26 made of PVA, and the like. In the second polarizing plate 22, each of the protective film for polarizing plates 34 and 36 are provided on both surfaces of a polarizer 32 made of PVA, and the like. Further, though not shown, a reflective sheet is provided on the opposite side to the side of the liquid crystal cell 2 of the light guide plate 10 to reflect the light discharged from the light guide plate 10 toward the liquid crystal cell 2.

In the liquid crystal display device 1, the light emitted from the light guide plate 10 is transmitted through the light diffusing plate 12, the lens film 14, and the luminance enhancing film 16, and thus a given polarized light is only transmitted through a first polarizing plate 18 comprising the polarizer 26, and becomes incident to the liquid crystal cell 2. The light transmitted through the liquid crystal cell 2 is corrected in the retardation plate 20, and becomes incident to the second polarizing plate 22 comprising the polarizer 32 with the angle of view widening, so that a given polarized light only is transmitted to become incident to eyes.

The optical film obtained from the cyclic olefin polymer composition of the present invention is applied, for example, in the protective film for polarizing plates 28, 30, 34, and 36, and the retardation plate 20, the light diffusing plate 12, and the lens film 14 in the liquid crystal display device 1.

In the present invention, the resulting optical film has excellent in optical properties such as transparency, low birefringence, and the like, and further, it has low water absorption, and as a result, it can be used as the protective film for polarizing plate 28, 30, 34, or 36. The retardation of the molded product obtained from the cyclic olefin polymer composition of the present invention is 10 nm or less at 650 nm. For this reason, it can be suitably used as the protective film for polarizing plate 30 for which low retardation is required.

The cyclic olefin polymer composition of the present invention has excellent in moldability such as flowability upon injection molding, and the like. Particularly, the cyclic olefin polymer composition according to the present invention is provided an injection molded product having excellent in appearance in which a flow mark is hardly perceptible by eyes.

The injection-molded product comprising the cyclic olefin polymer composition of the present invention can be used in a wide range of applications, since it has antistatic properties, and has excellent in transparency, rigidity, heat resistance, impact resistance, surface gloss, chemical resistance, and abrasion resistance. Thus, it can be used, for example, for articles in the electrical and electronics fields, such as water tanks for steam irons, parts and containers for microwave ovens, print circuit boards, high frequency circuit boards, electroconductive transparent sheets, diaphragms of speakers, carriers for semiconductor production, covers and decorations for lighting equipments, sealing agents for electronic elements, and the like; for articles in the food/medical field, such as denture base materials, various chemical containers, food containers, cosmetic containers, stopper cocks, cells for testing apparatus of blood, and the like, chemical resistant coatings, disposable syringes and containers, and the like; industrial parts, such as camera parts, and housings and containers for various measuring instruments and equipment, and the like; general goods for daily use, such as various sheets, helmets, protectors, spectacle nose-guards, and the like; and alternate materials for windshield glass and window glass, and the like. Further, it can be favorably used, by advantage of its transparency, as optical material, such as substrates for information disks such as magnet-optical disks, pigment-type disks, compact disks for music, simultaneously image date-sound date recording-playback disks, and the like; lenses and mirror lenses for an imaging system or a projection system used in cameras, VTR, copying machines, OHP, projection TV's, printers, and the like; lenses for the pick-up of information from information disks, bar codes, and the like; lenses for automobile lamps, and the spectacles and goggles; information transfer parts such as optical fiber and its connectors, and the like, and the like.

In the present invention, as the cyclic olefin polymer [BB], a random copolymer [BB-1] comprising a structural unit derived from one or more kind(s) of α-olefin having two or more carbon atoms, and a structural unit derived from one or more kind(s) of cyclic olefin selected from the group consisting of the cyclic olefin represented by the formula [II] and the cyclic olefin represented by the formula [III], or a graft modified product [BB-2] of the above [BB-1] is used.

Hereinbelow, the cyclic olefins represented by the formulae [II] and [III], that are raw materials for forming the cyclic olefin polymers [BB-1] to [BB-2], are described.

Cyclic Olefin

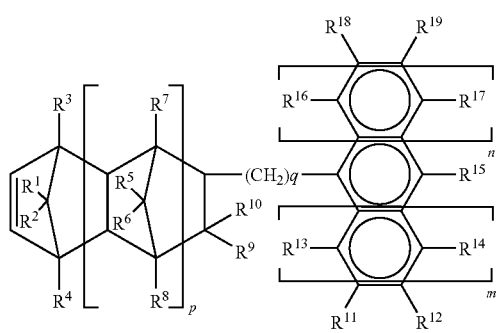

[II]

In the formula [II], p and q are each 0 or a positive integer, m and n are each 0, 1 or 2, $R^1$ to $R^{19}$ are each independently a hydrogen atom, a halogen atom, a hydrocarbon group which may be substituted with a halogen atom, or an alkoxy group, a carbon atom to which $R^9$ or $R^{10}$ is bonded, and a carbon atom to which $R^{13}$ is bonded or a carbon atom to which $R^{11}$ is bonded may be bonded directly or via an alkylene group having 1 to 3 carbon atoms, and $R^{15}$ and $R^{12}$, or $R^{15}$ and $R^{19}$ may be bonded to each other to form an aromatic ring which is a monocyclic or polycyclic group in the case of n=m=0.

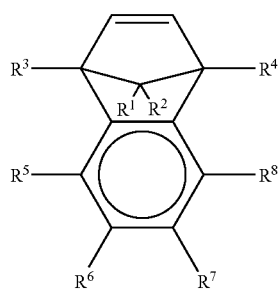

[III]

In the formula, $R^1$ to $R^8$ are each independently a hydrogen atom or a hydrocarbon group, and $R^5$ and $R^6$, $R^6$ and $R^7$, and $R^7$ and $R^8$ may be bonded to each other to form a monocyclic group, wherein the monocyclic group may have a double bond.

These are the same as in the above formulae [II] and [III] described for the section on the cyclic olefin polymer [B], and the meaning of each of the symbols is the same as in the formulae [II] and [III] for the section on the cyclic olefin polymer [B]. As specific examples of these cyclic olefins, the same ones as in the formulae [II] and [III] for the section on the cyclic olefin polymer [B] are exemplified.

[BB-1] Random Copolymer Comprising a Structural Unit Derived from an α-olefin Having Two or more Carbon Atoms and a Structural Unit Derived from One or more Kind(s) of Cyclic Olefin Selected from the Group Consisting of the Cyclic Olefin Represented by the Formula [II] and the Cyclic Olefin Represented by the Formula [III] (which may be Sometimes Referred to as a Random Copolymer [BB-1])

The random copolymer [BB-1] contains a unit derived from an α-olefin having two or more carbon atoms in an amount of usually 80 to 95% by mole, preferably 80 to 90% by mole, more preferably 81 to 90% by mole, and a unit derived from one or more kind(s) of cyclic olefin selected from the group consisting of the cyclic olefin represented by the formula [II] and the cyclic olefin represented by the formula [III] in a total amount of usually 5 to 20% by mole, preferably 10 to 20% by mole, more preferably 10 to 19% by mole. Here, the total of the α-olefin having two or more carbon atoms and the cyclic olefin is 100% by mole. Further, the composition of the α-olefin having two or more carbon atoms, and the composition of the cyclic olefin can be measured by $^{13}$C-NMR.

The α-olefin having two or more carbon atoms may be linear or branched, and it can be selected in a similar way to the above-described cyclic olefin polymer [A-1]. Among these, ethylene or propylene is preferable, and ethylene is particularly preferable. These α-olefins may be used alone or in combination of two or more kinds thereof.

As the cyclic olefin, specifically, the cyclic olefins represented by the formula [II] or the formula [III] are used. These cyclic olefins may be used alone or in combination of two or more kinds thereof.

In this random copolymer [BB-1], the units derived from the α-olefin having two or more carbon atoms as described above and the units derived from the cyclic olefin as described above are randomly bonded to give a substantially linear structure.

It appears that in the random copolymer [BB-1] used in the present invention, at least a part of the structural unit derived from one or more kind(s) of cyclic olefin selected from the group consisting of the cyclic olefin represented by the formula [II] and the cyclic olefin represented by the formula [III] constitutes the repeating units represented by the following formula [II-i] and the following formula [III-i].

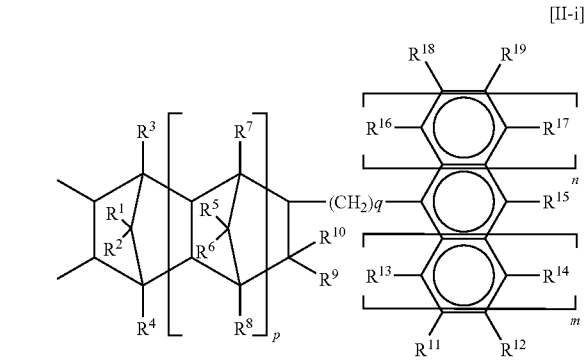

[II-i]

In the formula [II-i], n, m, p, q, and $R^1$ to $R^{19}$ have the same meanings as defined for the formula [II].

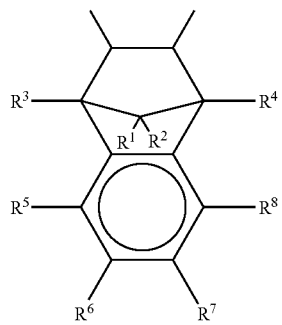

[III-i]

In the formula [III-i], $R^1$ to $R^8$ have the same meanings as defined for the formula [III].

Further, the random copolymer [BB-1] may have a unit derived from other copolymerizable monomers within a range not impairing the purpose of the present invention, if desired, and may specifically have a unit derived from an cyclic olefin represented by the formula [I] or other monomers in an amount of usually 20% by mole or less, preferably 10% by mole or less, based on 100% by mole of the total of a structural unit derived from an α-olefin having two or more carbon atoms and a structural unit derived from one or more kind(s) of cyclic olefin selected from the group consisting of the cyclic olefin represented by the formula [II] and the cyclic olefin represented by the formula [III].

Examples of these other monomers include a cyclic olefin other than the cyclic olefins represented by the formulae [I], [II] and [III], and specific examples thereof include cycloolefins such as cyclobutene, cyclopentene, cyclohexene, 3,4-dimethyl cyclopentene, 3-methylcyclohexene, 2-(2-methylbutyl)-1-cyclohexene and cyclooctene, 3a,5,6,7a-tetrahydro-4,7-methano-1H-indene, and the like, and non-conjugated dienes such as 1,4-hexadiene, 4-methyl-1,4-hexadiene, 5-methyl-1,4-hexadiene, 1,7-octadiene, dicyclopentadiene and 5-vinyl-2-norbornene, and the like. The random copolymer [BB-1] may contain two or more kinds of the units derived from the other monomers.

The random copolymer [BB-1] can be prepared using an α-olefin having two or more carbon atoms and one or more kind(s) of cyclic olefin selected from the group consisting of the cyclic olefin represented by the formula [II] and the cyclic olefin represented by the formula [III] by the same preparation method as for the random copolymer [A-1] comprising the α-olefin having two or more carbon atoms and the cyclic olefin.

[BB-2] Graft Modified Product

The graft modified product of the cyclic olefin polymer is a graft modified product of the random copolymer [BB-1] comprising the α-olefin having two or more carbon atoms and the cyclic olefin.

This graft modified product can be prepared by the same preparation method as for the graft modified product [A-4].

As the cyclic olefin of the cyclic olefin polymer [BB] used in the present invention, the cyclic olefin represented by the formula [III] is preferably used. The cyclic olefin polymer obtained by polymerizing or copolymerizing cyclic olefin represented by the formula [III] is well-balanced in heat resistance and flexibility.

For the cyclic olefin polymer [BB] used in the present invention, the intrinsic viscosity [η] in decalin at 135° C. is from 0.05 to 10 dl/g, preferably from 0.1 to 5 dl/g, more preferably from 0.5 to 5 dl/g. The glass transition temperature (Tg) is 50° C. or lower, preferably from −20 to 50° C., more preferably from −20 to 40° C. The glass transition temperature (Tg) can be obtained by DSC measurement or by viscoelasticity measurement.

The refractive index $n_D$[BB] as measured in accordance with ASTM D542 of the cyclic olefin polymer [BB] used in the present invention is not particularly limited, but it is preferably from 1.525 to 1.550, more preferably from 1.535 to 1.550, more preferably from 1.538 to 1.548.

Further, the crystallinity, as measured using DSC, is not particularly limited, but it is usually 5% or less, preferably 2%. Within this range, in particular, transparency and flexibility are excellent.

The cyclic olefin polymer [BB] of the present invention has excellent flexibility and a relatively high refractive index. The cyclic olefin polymer [BB] of the present invention can be widely used in the conventional applications of polyethylene or of elastomers.

Particularly preferable examples of the cyclic olefin polymer [BB] include the cyclic olefin polymers [B-1] and [B-2]. In this case, it is suitably used as one component of the cyclic olefin polymer composition.

As above, the embodiments of the present invention are described, but the embodiments added with suitable modifications made within a range not impairing the purpose of the invention are included in the embodiments of the present invention.

EXAMPLES

Hereinafter, the present invention is described in more detail with reference to Examples and Comparative Examples, but is not intended to be limited to these Examples. Further, in the present Examples, various physical properties were determined or evaluated by the following methods.

(1) Softening Temperature (TMA)

The measurement was made with TMAQ400 manufactured by TA Instruments, by the heat distortion behavior of a sheet having a thickness of 2 mm obtained by a press molding process. A load of 16 g was applied to a quartz needle placed on the sheet, and the temperature of the sheet was elevated at a rate of 5° C./min, whereby the temperature of a displacement point determined from a TMA curve in penetration mode, was defined as TMA.

(2) Glass Transition Temperature (Tg) and Crystallinity

The glass transition temperature (Tg) and crystallinity are measured using a DSC-220C manufactured by Seiko Denshi Kogyo Co. under a $N_2$ (nitrogen) atmosphere. The temperature was elevated to 200° C. at a heating rate of 50° C./min from room temperature, and maintained for 5 min, and then it was lowered to −100° C. at a cooling rate of 10° C./min, and maintained for 5 min. Further, the glass transition temperature (Tg) was determined from a heat absorption curve when the temperature was elevated to 200° C. at a heating rate of 10° C./min. When there was a heat absorption peak derived from a crystal component, a heat of fusion per unit weight was determined from the heat absorption peak area, and this was then divided by 70 cal/g as a heat of fusion of a polyethylene crystal.

(3) Young's Modulus (YM)

The Young's modulus is measured with a sheet having a thickness of 0.2 mm at room temperature in accordance with ASTM D638, under a condition of a distance between the chucks of 30 mm and a tensile rate of 30 mm/min.

(4) Haze

The Haze is determined with a sheet having a thickness of 0.1 mm in accordance with JIS K7136 by means of a haze meter.

(5) Folding Endurance (Times)

The Folding endurance is determined with a sheet having a thickness of 0.1 mm in accordance with JIS P8115 by means of an MIT tester.

(6) Retardation

The Retardation is determined with a sheet having a thickness of 0.1 mm by means of KOBRA-CCD manufactured by Oji Scientific Instruments.

Polymerization Example 1

[B] Ethylene-cyclic Olefin Copolymer

The copolymerization reaction of ethylene and 1,4-methano-1,4,4a,9a-tetrahydrofluorene (MTHF) represented by the following formula was carried out in the following manner.

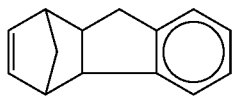

Nitrogen as an inert gas was flown into a glass-made reaction vessel having a volume of 2000 ml equipped with a stirring device at a flow rate of 25 Nl/hr for 30 minutes, and then 985 ml of cyclohexane, 15 ml of MTHF as a cyclic olefin, and 2.24 ml of a solution of ethylaluminum sesquichloride $((C_2H_5)_{1.5}AlCl_{1.5})$ in decane (concentration 2.214 mM/ml) were added thereto, and a polymerization solvent was stirred at a speed of 900 to 1000 rpm while the temperature of the solvent was adjusted to 35° C.

When the solvent temperature reached 35° C., in addition to nitrogen, ethylene and hydrogen were flown into the reaction vessel at a feeding rate of 50 Nl/hr and 4 Nl/hr, respectively, and then after 10 min has passed, 1.84 ml of a solution of $VO(OC_2H_5)Cl_2$ in hexane (concentration 0.271 mM/ml) that had been preliminarily put into a dropping lot in the upper side of the reaction vessel and 5 ml of hexane were added to the solution, thereby initiating the polymerization.

After 5 min has passed, 10 ml of methanol was added to stop the polymerization, thereby obtaining a polymerization solution containing an ethylene-cyclic olefin (MTHF) copolymer. Thereafter, the polymerization solution was transferred to a beaker having a volume of 2 L that had been separately prepared, 10 ml of concentrated hydrochloric acid and a stirring bar were further added thereto to make a contact therebetween for 2 hours under strong stirring, and thereby a demineralization treatment was carried out. The polymerization solution after demineralization treatment was added into the beaker to which an acetone at a three-fold volume based on the polymerization solution, had been put, under stirring, a copolymer was thus precipitated, and the precipitated copolymer was separated by filtration. The resulting polymer containing the solvent was dried under reduced pressure at 130° C. for 12 hours to obtain 10.5 g of an ethylene-MTHF copolymer.

The basic properties of the resulting ethylene-MTHF copolymer (B-1) are shown in Table 1.

Polymerization Examples 2 to 7

Polymerization was carried out in the same manner as in Example 1, except that a cyclopentadienebenzyne adduct (BNBD) represented by the following formula was used instead of MTHF of Example 1, to obtain an ethylene-BNBD copolymer (B-2). The basic properties of the resulting ethylene-BNBD copolymer (B-2) are shown in Table 1. Further, the procedure was carried out in the same manner, except that the kinds and the addition amount of the cyclic monomers were changed such that the composition of the copolymer was the same as indicated in Table 1, to obtain the ethylene-cyclic olefin copolymers (B-3) to (B-7). The basic properties of the resulting ethylene-cyclic olefin copolymers (B-3) to (B-7) are shown in Table 1.

TABLE 1

| Copolymer | Polymerization Example 1 (B-1) | Polymerization Example 2 (B-2) | Polymerization Example 3 (B-3) | Polymerization Example 4 (B-4) | Polymerization Example 5 (B-5) | Polymerization Example 6 (B-6) | Polymerization Example 7 (B-7) |
|---|---|---|---|---|---|---|---|
| Main monomer | Ethylene | Ethylene | Ethylene | Ethylene | Ethylene | Ethylene | Ethylene |
| Cyclic olefin | MTHF | BNBD | BNBD | BNBD | BNBD | BNBD | TD* |
| Content of cyclic olefin (mol %) | 12.3 | 14.6 | 14.1 | 13.9 | 16.8 | 11.4 | 15.1 |
| α-Olefin | — | — | Propylene | — | — | — | — |
| Content of α-olefin (mol %) | — | — | 4.4 | — | — | — | — |
| Content of ethylene (mol %) | 87.7 | 85.4 | 81.5 | 80.2 | 83.2 | 88.6 | 84.9 |
| Refractive index | 1.545 | 1.543 | 1.540 | 1.542 | 1.559 | 1.539 | 1.528 |
| [η] | 1.1 | 1.2 | 1.2 | 1.2 | 1.1 | 1.2 | 1.2 |
| Tg (° C.) | 18.0 | 12.2 | 6.7 | 8.2 | 31.8 | −0.2 | 29.0 |
| Crystallinity (%) | 0.0 | 0.0 | 0.0 | 0.0 | 0.0 | 19.5 | 0.0 |
| Young's modulus (YM) (Mpa) | 1100 | 550 | 210 | 380 | 1050 | 300 | — |

*Tetracyclo[4.4.0.1$^{2,5}$.1$^{7,10}$]-3-dodecene

Polymerization Example 8

[A] Ethylene-cyclic Olefin Copolymer

The copolymerization reaction of ethylene and tetracyclo [4.4.0.1$^{2,5}$.1$^{7,10}$]-3-dodecene (TD) represented by the following formula was carried out in the following manner.

Nitrogen as an inert gas was flown into a glass-made reaction vessel having a volume of 2000 ml equipped with a stirring device at a flow rate of 25 Nl/hr for 30 minutes, and then 985 ml of cyclohexane, 40 ml of TD as a cyclic olefin, and 4.48 ml of a solution of ethylaluminum sesquichloride ((C$_2$H$_5$)$_{1.5}$AlCl$_{1.5}$) in decane (concentration 2.214 mM/ml) were added thereto, and a polymerization solvent was stirred at a speed of 900 to 1000 rpm while the temperature of the solvent was adjusted to 35° C. When the solvent temperature reached 35° C., in addition to nitrogen, ethylene and hydrogen were flown into the reaction vessel at a feeding rate of 50 Nl/hr and 2 Nl/hr, respectively, and then after 10 min has passed, 3.68 ml of a solution of VO(OC$_2$H$_5$)Cl$_2$ in hexane (concentration 0.271 mM/ml) that had been preliminarily put into a dropping lot in the upper side of the reaction vessel and 5 ml of hexane were added to the solution, thereby initiating the polymerization.

After 5 min has passed, 10 ml of methanol was added to stop the polymerization, thereby obtaining a polymerization solution containing an ethylene-cyclic olefin (TD) copolymer. Thereafter, the polymerization solution was transferred to a beaker having a volume of 2 L that had been separately prepared, 10 ml of concentrated hydrochloric acid and a stirring bar were further added thereto to make a contact therebetween for 2 hours under strong stirring, and thereby a demineralization treatment was carried out. The polymerization solution after demineralization treatment was added into the beaker to which an acetone at a three-fold volume based on the polymerization solution, had been put, under stirring, a copolymer was thus precipitated, and the precipitated copolymer was separated by filtration. The resulting polymer containing the solvent was dried under reduced pressure at 130° C. for 12 hours to obtain 25.0 g of an ethylene-TD copolymer.

The basic properties of the resulting cyclic olefin polymer (A-1) are shown in Table 2.

TABLE 2

| | A-1 |
|---|---|
| Cyclic olefin resin | Ethylene-TD copolymer |
| [η] (dl/g) | 0.6 |
| Refractive index | 1.543 |
| Content of cyclic olefin (mol %) | 30 |
| TMA (° C.) | 130 |

Example 1

20 parts by weight of the cyclic olefin polymer (B-1) was melt-kneaded with 80 parts by weight of the cyclic olefin polymer (A-1) obtained in Preparative Example, using a twin-screw extruder at 250° C., and pelletized with a pelletizer. The resulting pellet was subjected to molding process with T die using a known extrusion molding machine (an extrusion molding machine manufactured by Thermoplastics: φ 30 mm). At an extrusion temperature of 250° C. and a take-up roll temperature of 80° C., a sheet having a width of 20 cm and a thickness of 0.1 mm was obtained. For the resulting sheet, the haze, the folding endurance times, and the ratadation were evaluated. The results are shown in Table 3.

Further, the resulting pellet was subjected to press molding, using a known press molding machine (an automatic press molding machine manufactured by SHINTO Metal Industries Corporation). At a melting temperature of 250° C., a press pressure upon melting of 10 MPa, a cooling temperature of 20° C., and a press pressure upon cooling of 10 MPa, a sheet having a thickness of 2 mm was obtained. For the resulting sheet, TMA was evaluated. The results are shown in Table 3.

TABLE 3

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Cyclic olefin resin A-1 | 80 | 80 | 80 | 80 | 80 | 80 | 80 | 100 |
| Cyclic olefin resin B-1 | 20 | | | | | | | |
| Cyclic olefin resin B-2 | | 20 | | | | | | |
| Cyclic olefin resin B-3 | | | 20 | | | | | |
| Cyclic olefin resin B-4 | | | | 20 | | | | |
| Cyclic olefin resin B-5 | | | | | 20 | | | |
| Cyclic olefin resin B-6 | | | | | | 20 | | |
| Cyclic olefin resin B-7 | | | | | | | 20 | |
| TMA (° C.) | 129 | 127 | 127 | 129 | 130 | 125 | 129 | 130 |
| Haze (%) | 1.0 | 0.9 | 1.0 | 0.8 | 15.6 | 45.2 | 21.2 | 1.0 |
| Folding endurance times (times) | 183 | 249 | 342 | 323 | 132 | 293 | 17 | 32 |
| Retardation at 590 nm (nm) | 0.8 | 0.9 | 1.1 | 1.2 | 1.2 | 1.1 | 0.9 | 0.8 |

Examples 2 to 4

A molded product was prepared in the same manner as in Example 1, except that the ethylene-cyclic olefin copolymers (B-2) to (B-4) were used in the amounts as shown in Table 3, and evaluated in the same manner as in Example 1. The results are shown in Table 3.

Comparative Examples 1 to 3

A molded product was prepared in the same manner as in Example 1, except that the ethylene-cyclic olefin copolymers (B-5) to (B-7) were used, and evaluated in the same manner as in Example 1. The results are shown in Table 3.

Comparative Example 4

A molded product was prepared in the same manner as in Example 1, except that the cyclic olefin polymer (A-1) was used alone, and evaluated in the same manner as in Example 1. The results are shown in Table 3.

As described above, the film obtained in each of Examples was excellent in toughness, as well as in low birefringence, heat resistance, transparency and low water absorption. In Comparative Examples 1 to 3, the transparency of the films was insufficient while the toughness thereof was excellent. In Comparative Example 4, the toughness of the film was insufficient while the transparency thereof was excellent.

The invention claimed is:

1. A cyclic olefin polymer composition comprising:
    [A] a cyclic olefin polymer which (1) is selected from the group consisting of the following [A-1], [A-2], [A-3] and [A-4], and (2) has a softening temperature (TMA) of 120 to 300° C., and
    [B] a cyclic olefin polymer which (1) is selected from the group consisting of the following [B-1], [B-2], and (2) has a glass transition temperature (Tg) of 6.7 to 12.2° C.,
    wherein an absolute value of the difference between the refractive indices represented by the following equation is 0.003 or less;

$|n_D[B]-n_D[A]|$ wherein $n_D[B]$ represents the refractive index of the cyclic olefin polymer [B], and $n_D[A]$ represents the refractive index of the cyclic olefin polymer [A], which are measured in accordance with ASTM D542, and
    wherein the component [A] is contained in the amount of 50 to 95 parts by weight and the component [B] is contained in the amount of 5 to 50 parts by weight, provided that the total amount of the components [A] and [B] is defined as 100 parts by weight,
    [A-1] a random copolymer comprising a structural unit derived from an α-olefin having two or more carbon atoms and a structural unit derived from a cyclic olefin represented by the following formula [I];

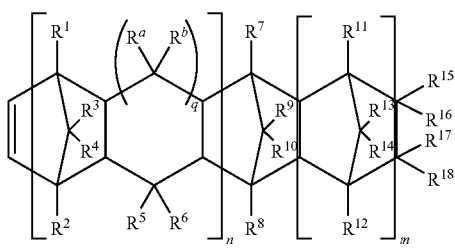

wherein in the formula [I], n is 0 or 1, m is 0 or a positive integer, q is 0 or 1, $R^1$ to $R^{18}$ and $R^a$ and $R^b$ are each independently a hydrogen atom, a halogen atom, or a hydrocarbon group which may be substituted with a halogen atom, $R^{15}$ to $R^{18}$ may be bonded to each other to form a monocyclic or polycyclic group, and the monocyclic or polycyclic group may have a double bond, and further, $R^{15}$ and $R^{16}$, or $R^{17}$ and $R^{18}$ may together form an alkylidene group,

[A-2] a ring-opening polymer or copolymer of the cyclic olefin represented by the formula [I],
[A-3] a hydrogenated product of the ring-opening polymer or copolymer [A-2],
[A-4] a graft modified product of the [A-1], [A-2] or [A-3]
[B-1] a random copolymer comprising a structural unit derived from one or more kind(s) of α-olefin having two or more carbon atoms and a structural unit derived from one or more kind(s) of a cyclic olefin represented by the following formula [III];

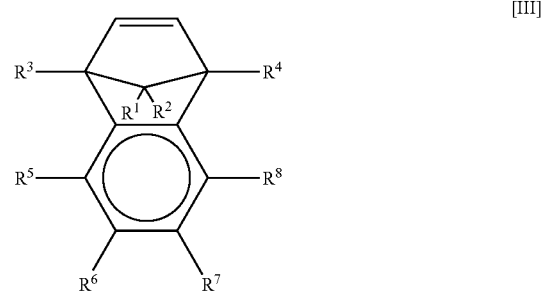

wherein the unit derived from one or more kind(s) of the cyclic olefin represented by the formula [III] is in an amount of 13.9 to 14.6% by mole, and
$R^1$ to $R^8$ are each independently a hydrogen atom or a hydrocarbon group, and $R^5$ and $R^6$, $R^6$ and $R^7$, and $R^7$ and $R^8$ may be bonded to each other to form a monocyclic group which may contain a double bond, and
[B-2] a graft modified product of the [B-1],
wherein said cyclic olefin polymer [B] has a crystallinity, as measured using DSC, of 5% or less,
wherein when the composition is formed into a sheet having a thickness of 0.1 mm, the sheet exhibits a haze, as measured in accordance with JIS K7136, of 1% or less.

2. The cyclic olefin polymer composition as claimed in claim 1, wherein when the composition is formed into a sheet having a thickness of 0.1 mm, the sheet exhibits a phase difference at a wavelength 650 nm of 10 nm or less.

3. The cyclic olefin polymer composition as claimed in claim 1, wherein said cyclic olefin polymer [A] is selected from the group consisting of said [A-1], [A-2] and [A-3].

4. The cyclic olefin polymer composition as claimed in claim 1, wherein said cyclic olefin polymer [A] has an intrinsic viscosity [η], as measured in decalin at 135° C., in the range of 0.05 to 10 dl/g.

5. The cyclic olefin polymer composition as claimed in claim 1, wherein said cyclic olefin polymer [B] has an intrinsic viscosity [η], as measured in decalin at 135° C., in the range of 0.5 to 5 dl/g.

6. The cyclic olefin polymer composition as claimed in claim 1, wherein the softening temperature (TMA) of said cyclic olefin polymer composition is 120 to 300° C.

7. A molded product comprising said cyclic olefin polymer composition as claimed in claim 1.

8. The molded product as claimed in claim 7, wherein said molded product is a film or a sheet.

9. The molded product as claimed in claim 7, wherein said molded product is an optical film or an optical sheet.

10. The molded product as claimed in claim 7, which is an injection molded product.

11. A protective film for polarizing plate comprising said cyclic olefin polymer composition as claimed in claim 1.

12. A polarizing plate comprising said protective film for polarizing plate as claimed in claim 11 on at least one side of a polarizer.

13. A liquid crystal display device comprising said polarizing plate as claimed in claim 12.

14. A cyclic olefin polymer composition comprising:

[A] a cyclic olefin polymer which (1) is selected from the group consisting of the following [A-1], [A-2], [A-3] and [A-4], which (2) has a softening temperature (TMA) of 120 to 300° C., and which (3) has a intrinsic viscosity [η], as measured in decalin at 135° C., in the range of 0.05 to 10 dl/g, and

[B] a cyclic olefin polymer which (1) selected from the group consisting of the following [B-1]and [B-2], (2) has a glass transition temperature (Tg) of 6.7 to 12.2° C., (3) has a crystallinity, as measured using DSC, of 5% or less, and (4) has an intrinsic viscosity [η], as measured in decalin at 135° C., in the range of 0.5 to 5 dl/g, wherein an absolute value of the difference between the refractive indices represented by the following equation is 0.003 or less;

$$|n_D[B]-n_D[A]|$$

wherein $n_D[B]$ represents the refractive index of the cyclic olefin polymer [B], and $n_D[A]$ represents the refractive index of the cyclic olefin polymer [A], which are measured in accordance with ASTM D542, wherein the component [A] is contained in the amount of 50 to 95 parts by weight and the component [B] is contained in the amount of 5 to 50 parts by weight, provided that the total amount of the components [A] and [B] is defined as 100 parts by weight, and

[A-1] a random copolymer comprising a structural unit derived from an α-olefin having two or more carbon atoms and a structural unit derived from a cyclic olefin represented by the following formula [I];

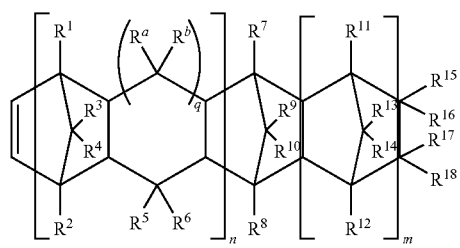

wherein in the formula [I], n is 0 or 1, m is 0 or a positive integer, q is 0 or 1, $R^1$ to $R^{18}$ and $R^a$ and $R^b$ are each independently a hydrogen atom, a halogen atom, or a hydrocarbon group which may be substituted with a halogen atom, $R^{15}$ to $R^{18}$ may be bonded to each other to form a monocyclic or polycyclic group, and the monocyclic or polycyclic group may have a double bond, and further, $R^{15}$ and $R^{16}$, or $R^{17}$ and $R^{18}$ may together form an alkylidene group,

[A-2] a ring-opening polymer or copolymer of said cyclic olefin represented by the formula [I],

[A-3] a hydrogenated product of said ring-opening polymer or copolymer [A-2],

[A-4] a graft modified product of said [A-1], [A-2] or [A-3]

[B-1] a random copolymer comprising a structural unit derived from one or more kind(s) of α-olefin having two or more carbon atoms and a structural unit derived from one or more kind(s) of a cyclic olefin represented by the following formula [III];

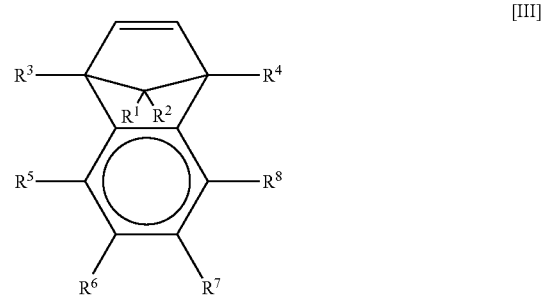

wherein the unit derived from one or more kind(s) of the cyclic olefin represented by the formula [III] is in an amount of 13.9 to 14.6% by mole, and $R^1$ to $R^8$ are each independently a hydrogen atom or a hydrocarbon group, and $R^5$ and $R^6$, $R^6$ and $R^7$, and $R^7$ and $R^8$ may be bonded to each other to form a monocyclic group which may contain a double bond, and

[B-2] a graft modified product of said [B-1].

15. A cyclic olefin polymer, which is a random copolymer comprising a structural unit derived from one or more kind(s) of α-olefin having two or more carbon atoms, and a structural unit derived from one or more kind(s) of cyclic olefin represented by the formula [III], and has an intrinsic viscosity [η], as measured in decalin at 135° C., of 0.5 to 1.2 dl/g, and has a glass transition temperature (Tg) of 6.7 to 12.2° C.,

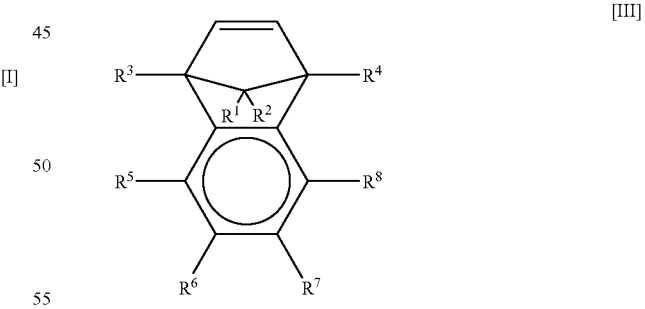

wherein the unit derived from one or more kind(s) of the cyclic olefin represented by the formula [III] is in an amount of 13.9 to 14.6% by mole, and $R^1$ to $R^8$ are each independently a hydrogen atom or a hydrocarbon group, and $R^5$ and $R^6$, $R^6$ and $R^7$, and $R^7$ and $R^8$ may be bonded to each other to form a monocyclic group and said monocyclic group may contain a double bond.

* * * * *